United States Patent [19]
Endfield

[11] 4,360,892
[45] Nov. 23, 1982

[54] PORTABLE WORD-PROCESSOR

[75] Inventor: Cyril Endfield, London, England

[73] Assignee: Microwriter Limited, London, England

[21] Appl. No.: 188,571

[22] Filed: Sep. 18, 1980

Related U.S. Application Data

[63] Continuation-in-part of Ser. No. 13,824, Feb. 22, 1979, abandoned.

[51] Int. Cl.³ .............................................. G06F 3/023
[52] U.S. Cl. ................................. 364/900; 178/17 C; 178/79; 340/365 S
[58] Field of Search ............ 340/146.3 SY, 146.3 AH, 340/146.3 Z, 146.3 A, 365 R, 365 S, 152 R, 311; 364/200 MS File, 900 MS File; 178/30, 17 R, 17 C, 21, 23 R, 79; 35/35 A, 38; 400/91-94

[56] References Cited

U.S. PATENT DOCUMENTS

| | | | |
|---|---|---|---|
| 3,022,878 | 2/1962 | Seibel et al. | 340/365 R |
| 3,428,747 | 2/1969 | Alferieff | 178/17 R |
| 3,833,765 | 9/1974 | Hilborn et al. | 178/79 |
| 3,976,995 | 8/1976 | Sebestyen | 340/365 R |
| 3,980,823 | 9/1976 | Howard | 178/30 |
| 4,007,443 | 2/1977 | Bromberg et al. | 340/365 E |
| 4,042,777 | 8/1977 | Bequaert et al. | 178/79 |
| 4,067,431 | 1/1978 | Whitaker | 340/365 R |
| 4,095,046 | 6/1978 | Frutiger et al. | 178/30 |
| 4,132,976 | 1/1979 | Siegal | 179/90 K |
| 4,159,471 | 6/1979 | Whitaker | 340/146.3 Z |

FOREIGN PATENT DOCUMENTS 1170570 11/1969 United Kingdom .
1292113 10/1972 United Kingdom .
1496522 12/1977 United Kingdom .

*Primary Examiner*—Leo H. Boudreau
*Attorney, Agent, or Firm*—LeBlanc, Nolan, Shur & Nies

[57] ABSTRACT

Disclosed herein is a portable word-processor comprising the following components; a micro-processor and, connected thereto, a manually operable input chord keyboard having four finger keys and at least one thumb key, the micro-processor being programmed to respond to signals produced by operation of a chord of a combination of up to a maximum of five keys to generate a coded signal representing a particular alpha-numeric character or processing instruction; a display device; output means for connection of the word-processor to a printer; memory means; and an internal power supply connected to power all the aforesaid components; the micro processor being additionally programmed so as to process the character signals in response to the instruction signals, feed signals to the display device for display of processed characters as an edited text, and to the memory means to store the edited text and print format instruction signals available for transmission through the output means.

14 Claims, 7 Drawing Figures

A  *  
B  8

C  (  
D  3

E  1  
F  4

G  7  
H  −

Y ? Z %

, - !

, @

PORTABLE WORD-PROCESSOR

This application is a continuation-in-part of Application Ser. No. 013,824 filed Feb. 22nd, 1979, now abandoned.

FIELD OF THE INVENTION

This invention relates to a single hand portable electronic word-processor that has a "touch-type" or "chord" keyboard. By "single hand portable" is meant a device which can comfortably be held by one of an operator's hand and operated by the other or supported against a surface and operated by one hand.

BACKGROUND OF THE INVENTION

Known, non-portable word-processors are electronic keyboard devices which can manipulate, or process text input to the device as alpha-numeric characters from a conventional, designated-key keyboard, such as the "Qwerty" keyboard for typewriters, teleprinters and computer terminals, in response to a programme and instructions input to the device via the keyboard and pass the processed text on to printing or other devices.

Any word-processor should include the features of:

a "cursor", to enable any part of the text stored in a memory to be displayed;

"editing", to enable the insertion, deletion or correction of text; and

"print formatting", for the control of a printer for the "lay-out" of edited text when it is printed, such as left and right margin justification and/or tabulation and/or margin indenting and/or end of page pause.

The term "non-portable" is meant, in the context of this description, to be a device which is not self-powered and is not capable of easily being carried from one place to another.

A portable electronic keyboard device is known in the form of a portable teletype machine having a conventional keyboard which will store alpha-numeric character next and typing instructions input to the machine in much the same way as a conventional teleprinter, the machine also having the facility to allow any text in the display to be deleted before it is stored. This facility does not make such a machine a word-processor within the meaning of this description.

Electronic devices are also known having a "touch-type" or "chord" keyboard, wherein a character is input by an operator by the operation of a chord of a combination of one or more keys.

OBJECT OF THE INVENTION

It is an object of the present invention to provide a word-processor of a size that can be held in one of an operator's hands and operated by the other hand. All the usual word-processor features of editing and storing input alpha-numeric text and of controlling the printed format of the edited text, when the word-processor is connected to a printer, are present; together with a keyboard of sufficiently small physical size for such a single hand portable device.

SUMMARY OF THE INVENTION

According to the present invention, a single hand portable word-processor comprises the following components:

a micro-processor and, connected thereto, a manually operable input chord keyboard having four finger keys and at least one thumb key, the micro-processor being programmed to respond to signals produced by operation of a chord of a combination of up to a maximum of five keys to generate a coded signal representing a particular alpha-numeric character or processing instruction; a display device; output means for connection of the word-processor to a printer; memory means; and an internal power supply connected to power all the aforesaid components; the micro-processor being additionally programmed so as to process the character signals in response to the instruction signals, feed signals to the display device for display of processed characters as an edited text, and to the memory means to store the edited text and print format instruction signals available for transmission through the output means.

The four finger keys are each positioned so as to be preferentially operated by a particular one of the four fingers of an operator's hand whilst, in a preferred embodiment, two keys are provided and positioned to be convenient to and operated by the operator's thumb. Thus two five-finger keyboards are effectively available and have a sufficient number of combinations to satisfy the input requirements of alpha-numeric characters and processing instructions. Also, such a five finger chord keyboard is of a sufficiently small size for a single hand portable word-processor.

ADVANTAGES OF THE INVENTION

The use of a chord keyboard for the single hand portable word-processor of this invention has produced an unexpected result beyond the mere scaling down in size accorded by modern solid state electronic technology and the natural "hand" size of the five-finger chord keyboard.

Heretofore, the speed of inputting data via the conventional keyboard of a hand-held electronic device, such as the designated keyboard of a pocket calculator, has not been of major relevance to the utility of the device.

However, for a hand-held word-processor to have any real commercial usefulness or utility, it must be capable of being operated at input speeds comparable to that of conventional keyboard machines otherwise it would not be used in everyday commerce or business but would merely be an executive toy.

It has been discovered that the single hand portable word-processor of this invention is capable of being operated at speeds of between 35 and 60 words per minute, i.e. at conventional typing speeds.

Furthermore, the preferred programme for the word-processor includes a pictographic relationship between the key chord or combination to be operated and the majority of the alphabetic characters; this relationship provides a quick learning mnemonic to aid initial acceptance of the word-processor by an operator, who quickly learns to use the word-processor at "reasonable" input speeds. The aforementioned input speeds being, understandably, those of a practised operator.

THE DRAWINGS

FIGS. 4a to d are charts illustrating key-operator codes for alpha-numeric characters and punctuation.

DETAILED DESCRIPTION OF PREFERRED EMBODIMENT

Figure 1:
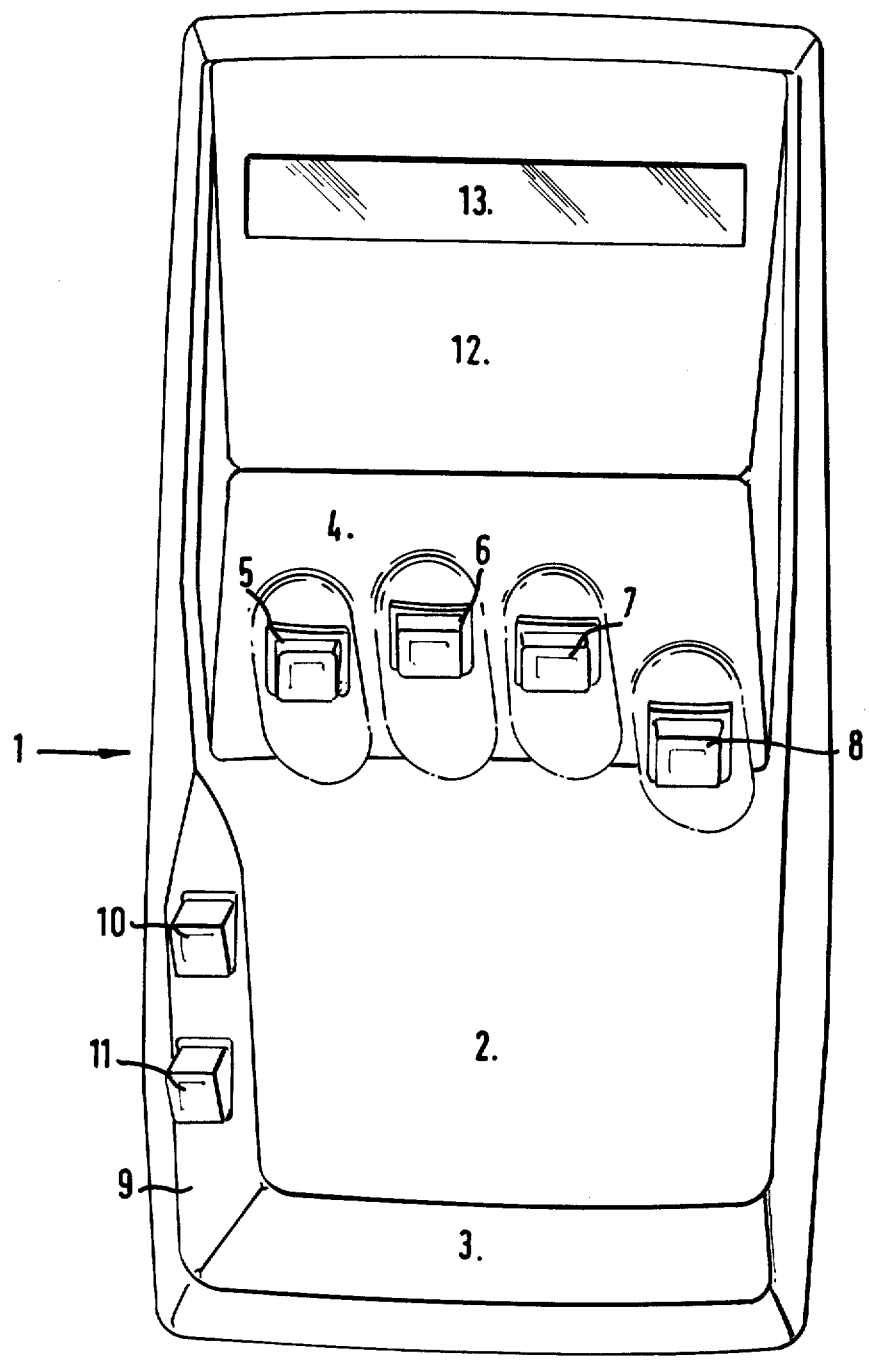
FIG. 1 is a plan view of a single hand portable word-processor in accordance with the invention.
Figure 2:
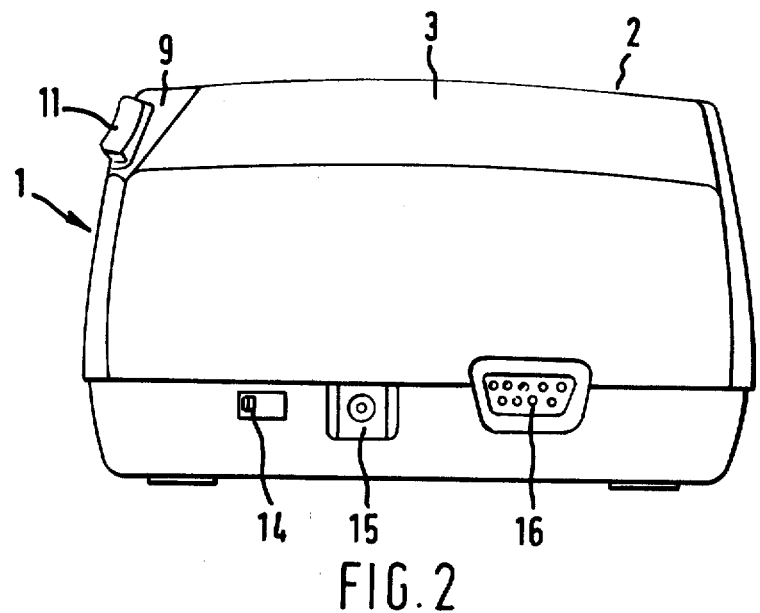
FIG. 2 is an end elevation of the processor of FIG. 1.

The word-processor 1, shown by FIGS. 1 and 2 has a main body part generally in the form of a truncated square pyramid.

The rear face 3 of this pyramid is essentially planar and is intended to be used as a rest for the heel of an operator's hand. The opposite face 4 carries four keys 5, 6, 7 and 8 arranged to be operated solely by the first, index, ring and little fingers respectively of the operator's hand. A side face 9 of the body pyramid 2 carries two further keys 10 and 11, each to be operated by the operator's thumb.

With these two "thumb" keys 10 and 11, two five-key keyboards are produced, each being operable by movement of the fingers and thumb of an operator's right hand without relative movement between that hand and the rest 3. A suitable five-keyed keyboard being described in United Kingdom Pat. No. 1496522.

The front face 4 of the main body has a forwardly and upwardly sloping extension 12 that carries an alphanumeric display 13 that can show characters produced by selective operation of any one key or a combination of up to a maximum of five keys.

Each key consists of a button mounted to operate a conventional micro-switch and, as shown by FIG. 1, the finger keys 5, 6, 7 and 8 are each set in ellipsoidally concave insets in the front face 4. These insets serving to guide and help retain the appropriate finger against the respective finger-key.

As shown by FIG. 2 the rear face 3 of the main body part also contains an ON-OFF switch 14, a Charger Socket 15 and a Data Socket 16.

Figure 3:
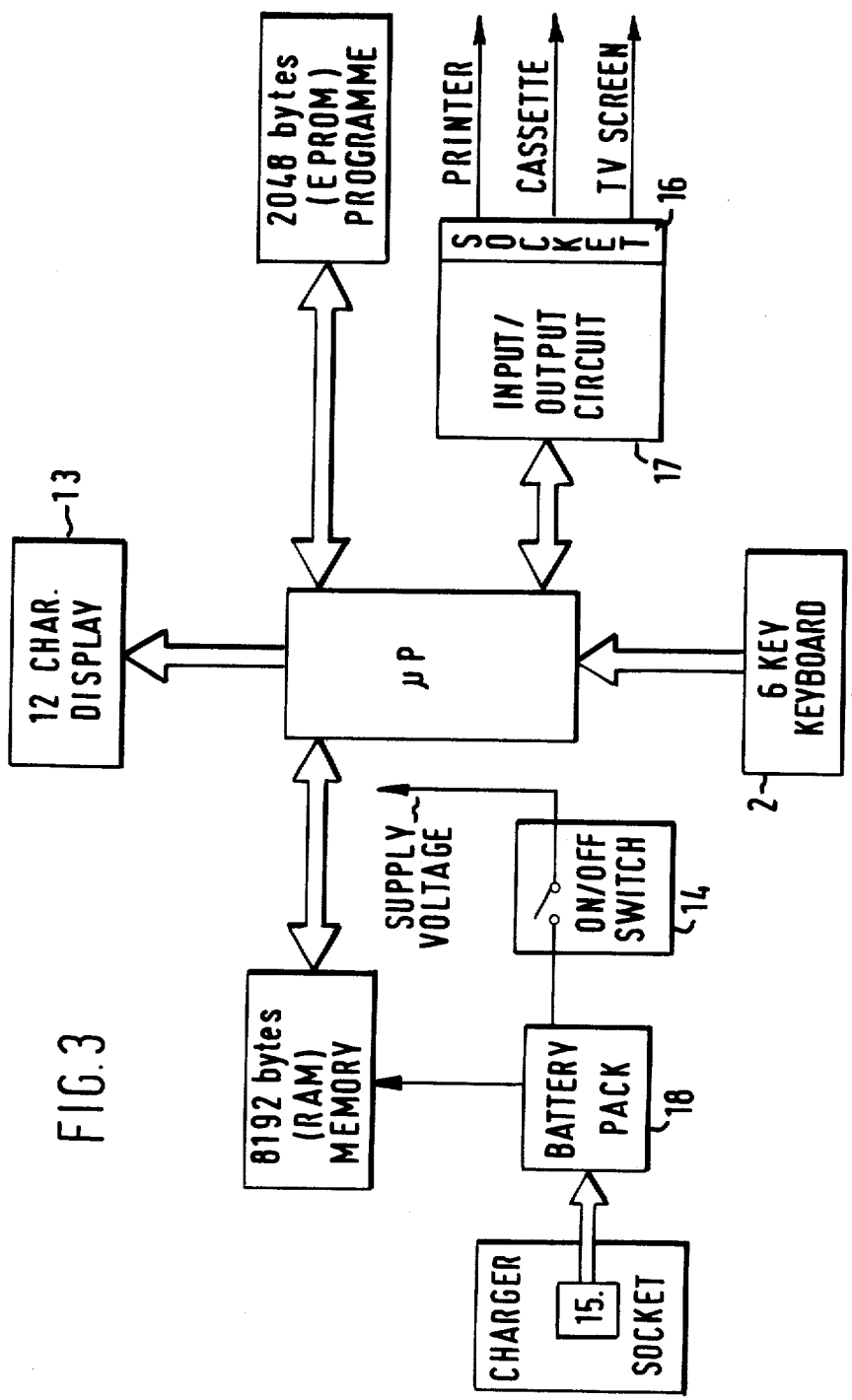
FIG. 3 is a block circuit diagram for the processor.
Figure 4A:
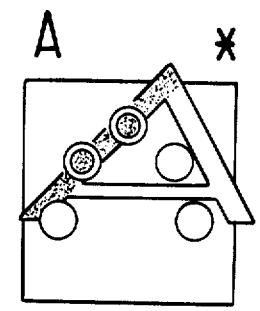
Figure 4A:
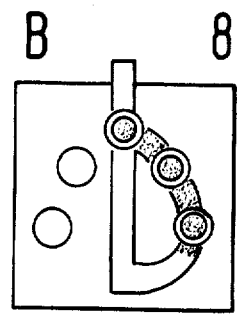
Figure 4A:
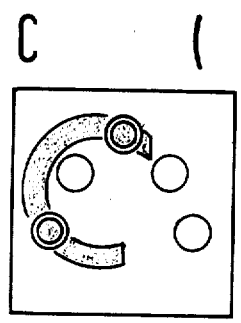
Figure 4A:
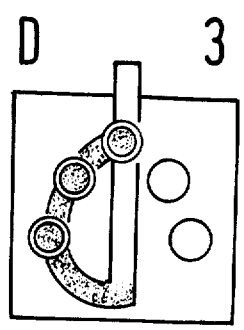
Figure 4A:
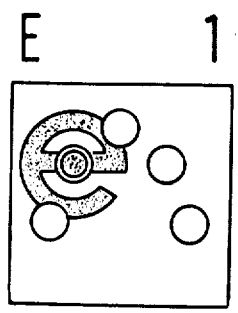
Figure 4A:
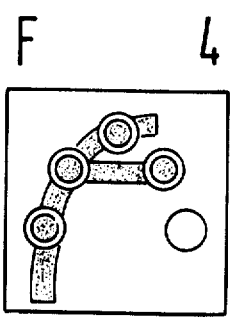
Figure 4A:
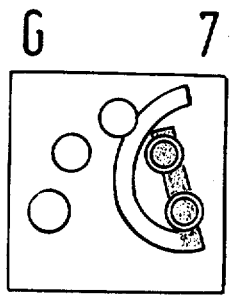
Figure 4A:
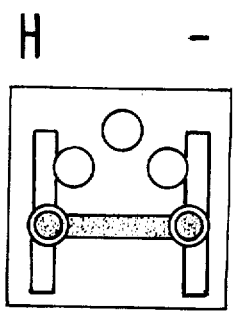
Figure 4B:
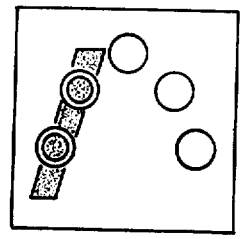
Figure 4B:
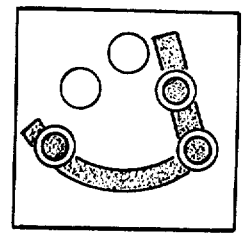
Figure 4B:
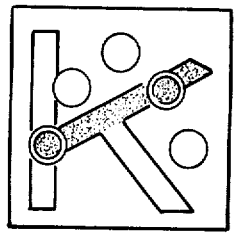
Figure 4B:
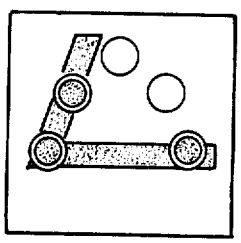
Figure 4B:
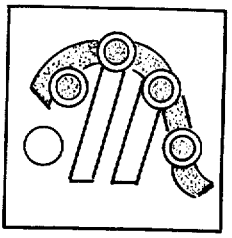
Figure 4B:
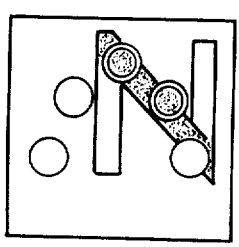
Figure 4B:
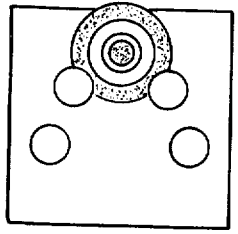
Figure 4B:
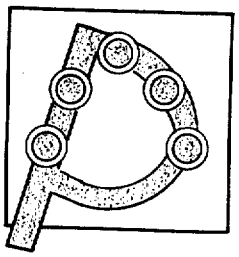
Figure 4C:
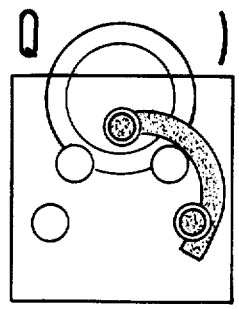
Figure 4C:
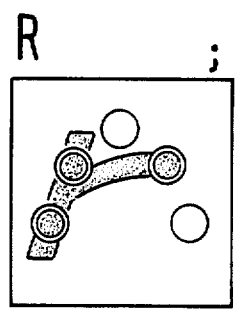
Figure 4C:
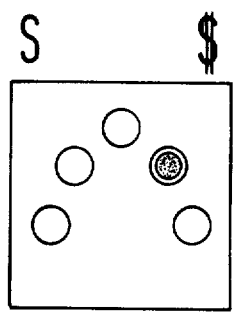
Figure 4C:
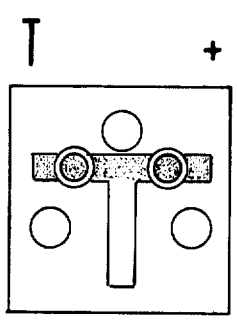
Figure 4C:
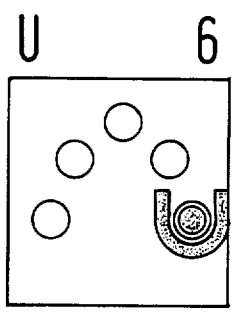
Figure 4C:
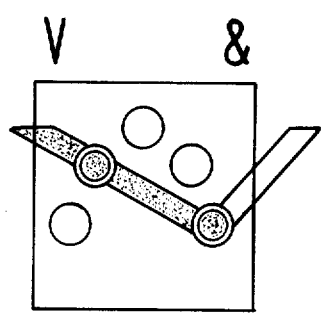
Figure 4C:
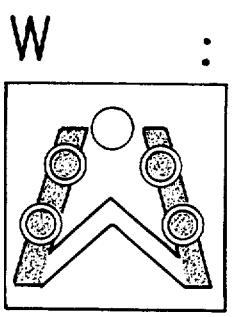
Figure 4C:
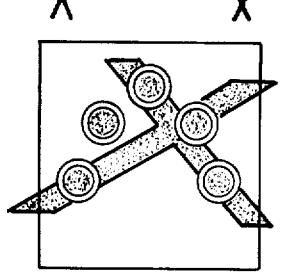
Figure 4D:
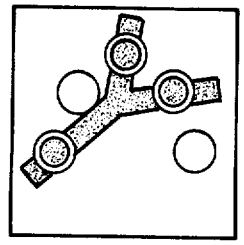
Figure 4D:
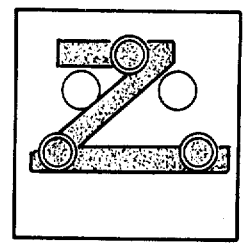
Figure 4D:
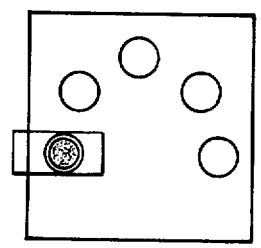
Figure 4D:
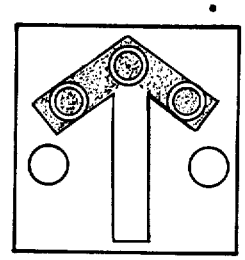
Figure 4D:
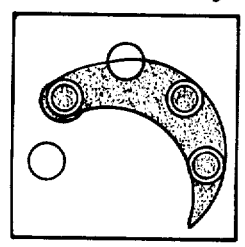
Figure 4D:
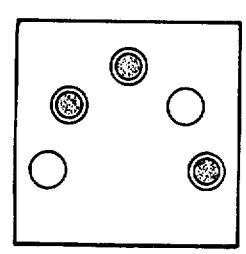
Figure 4D:
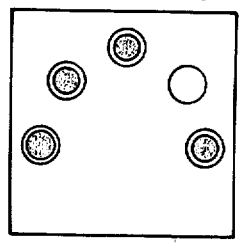

The electronic circuit for the processor is illustrated in block diagram by FIG. 3 which shows a CMOS 8 bit microprocessor $\mu P$ (RCA type CDP 1802) to which are connected the six key keyboard 2, an 8192 byte CMOS RAM memory (8× Toshiba Type TC 5047P), a 12 character alpha-numeric LED display (Litronix Type DL 1416), a 2048 byte CMOS EPROM memory (Intersil Type 1M 6604) and an input/output circuit 17 connected to the DATA socket 16. The input/output circuit is to enable the word-processor to communicate with an external device such as a printer. Other external devices could be a TV or monitor visual display unit or a cassette recorder to provide additional magnetic storage.

The processor is powered from a re-chargeable battery pack 18 connected to the Charger Socket 15. The ON/OFF switch 14 generally controls the supply of power (voltage) to the device with the exception of the RAM memory which has a direct connection to the battery pack 18, by-passing the ON/OFF switch. This effectively renders the RAM memory non-volatile. Thus data can be retained in the RAM memory with the unit switched-off as long as sufficient power remains in the battery pack (this can be up to three weeks).

A resident programme (detailed hereafter) is stored in the EPROM memory that enables the word-processor to operate in the manner to be hereinafter described.

In use, the processor $\mu P$ scans the keyboard micro-switches and starts to assemble a character when any key is depressed (operated). This process continues until all the keys in a particular character code have been released, at which point the assembled code is converted to ASC11, 7 bit code and stored in the memory RAM.

Characters assembled and stored in the memory RAM form a text that can be accessed by keying various control-code characters in order to cause any selected part of the text to be displayed on the display 13, the "cursor"; to edit the text stored in the memory (RAM); or to store print formatting instructions.

The unit's resident programme provides most of the aforesaid editing and print formatting facilities found in conventional, non-portable word-processors.

The resident programme detects low battery voltage and warns the operator with a message (CHARGE-ME) on the display 13. The resident programme also enables the word-processor to communicate, via suitable interfaces, with a number of external devides such as a Daisy wheel printer, a TV or moniprogramme permitting operator-defined areas of text stored in the memory RAM to be transmitted through the input/output circuit 17 to an external device connected to the DATA socket 16. In the case of a printer or screen display, the programme automatically formats the text, justifies left and right margins and sets tabs.

The programme also enables text to be read into the memory RAM from an external device connected to the DATA socket.

In scanning the keyboard micro-switches, the microprocessor $\mu P$ is programmed to respond to operative strokes or chords of the keyboard. A chord being defined as the acts of operating and then releasing a single key or the acts of operating the keys of a selected keys-combination, either simultaneously or sequentially, and then releasing the operated keys; the Chord being completed when the or all the operated keys have been released. Completion of a chord being the condition for the processor to store an assembled code representing a particular character.

FIG. 4 illustrates a particularly suitable operator code for use with the word-processor. The arrangement of the keys corresponding to a given pattern of five points of which a point or points combination lies on the outline of the majority of the alphabet letters of a given type face, the relationship between unique signals produced by operating selected keys or key-combinations and the alphabet letters represented thereby being such that, for such majority of the alphabet, there is a graphic correlation between a letter and the point or points-combination occupied by the key or keys-combination for a chord required to generate the unique signal representing that letter.

The figure shows a series of 31 five-point patterns being the maximum number of ways of combining five points. Each point represents the nominal position of one key being, from left to right, the thumb key 10, the index finger key 5, the middle finger key 6, the ring finger key 7 and the little finger key 8 respectively.

A black point represents a key to be operated and the alphabet letter or other character represented by that particular point or points-combination is shown in its pictographic relation, wherever this is possible, with that point or points-combination. These characters that can be entered into the word-processor by simple operation of the five keys 10, 5, 6, 7 and 8 are referred to as the alphabet register.

For this alphabet register, operation of the thumb key 10 alone signals a SPACE; finger keys 5, 6 and 7 signals a FULL STOP; finger keys 5, 7 and 8 a COMMA; keys 10 5, 6 and 8 an APOSTROPHE and finger keys 5, 6 and 8 a DASH.

The other thumb key 11 is a control key, the operation of which puts the unit into a punctuation and numeric register. The points codes for punctuation and numbers are also given by FIG. 4. It will be seen that the number codes follow the conventional deaf and dumb sign number system.

Operation of this thumb control key 11 in combination with the four finger keys 5, 6, 7 and 8 provides another five-key keyboard and this second keyboard is used to input control or processing instructions to the word-processor. The control instructions listed below are given by means of codes based on the equivalent alphabet letter codes. For convenience these are denominated by the letter underlined, for example D the code signal produced by operation of the thumb control key 11 with finger keys 5 and 6.

| CONTROL | KEY COMBINATION | DISPLAY |
|---|---|---|
| Register switch | Key 11 | — |
| Upper case: | | |
| single character | Y; Keys 11, 6, 7 | — |
| Upper case lock | P; Keys 11, 5, 6, 7, 8 | — |
| Unlock upper case | Y, P | — |
| Single space forward | F; Keys 11, 5, 6, 7 | Display advances by one space. |
| Continuous forward read | Y, F | Display reads forward continuously. |
| Single space backward | K; Keys 11, 7 | Display goes back one space. |
| Continuous backward read | Y, K | Display reads backwards continuously. |
| Halt | H; Keys 11, 8 | Display movement stops. |

-continued

| CONTROL | KEY COMBINATION | DISPLAY |
|---|---|---|
| Single character deletion | D; Keys 11, 5, 6 | Character on right of display is erased and is replaced by the next character (or space) in the memory. |
| Continuous deletion | Y, D | Above process repeats automatically. |
| Instant deletion | W, W; Keys 11, 5, 7, 8 | Memory deleted between signs > and <. |
| Insertion | I; Keys 11, 5 | Flashing symbol ⊠ on right of display. |
| Cancel insertion | Y, I | Above display ceases. |
| Carriage return | C; Keys 11, 6 | [ |
| Tabulate | R; Keys 11, 5, 7 | ∧ |
| Margin in | '; Keys 11, 5, 6, 8 | > (flashing). |
| Cancel margin in | Y, ' | < (flashing) |
| Start printing sign | L; Keys 11, 5, 8 | > |
| Stop print sign | Y, L | < |
| Short zip | Z; Keys 11, 6, 8 | Display jumps ahead by 128 characters or next > sign, whichever is shorter zip. |
| Long zip | Y, Z | Display jumps to next >. |
| Short jump-back | J; Keys 11, 7, 8 | Display jumps back to previous >. |
| Long jump-back | Y, J | START (of memory). |
| Print (single space) | X; Keys 11, 6, 7, 8 | PRINT. |
| Print (double space) | Y | PRINT. |

```
0001
0002                  *************** MWPA ******************************
0003                  *
0004                  *  MICROWRITER PROGRAMME  LEVEL PA   27/11/79
0005                  *    2 LEVEL VOLTAGE DETECT WITH NEW AMI
0006                  *
0007                  ******************************************************
0008                  *
0009                  *  0 MAIN PC
0010                  *  1 DISPLAY SUBROUTINE ADDRESS
0011                  *  2 GET CHARACTER SUBROUTINE ADDRESS
0012                  *  3 H - CURSOR MASK(LIST)   L - TEMPORARY LOOP COUNT
0013                  *             MARGIN (PRINT)           TAB (PRINT)
0014                  *  4 GENERAL SUBROUTINE ADDRESS
0015                  *  5 PRINTER INTERFACE SUB ADDR.  (TEMP)
0016                  *  6 VDU POINTER
0017                  *  7 VDU POINTER
0018                  *  8 H - KEY PRESSED STORE   L - LAST KEY CHARACTER
0019                  *  9 L - CURS FLAG & DELAY   L - KEY SHIFT MODE
0020                  *  A EXTERNAL DELAY
0021                  *    H - LINE FEED COUNT   L - CHAR COUNT (PRINT)
0022                  *  B H - MARGIN     L - TEMP CHAR. (AMI)
0023                  *  C TEMPORARY POINTER (JUMP, DISP,PACK)
0024                  *  D ADDRESSES TEMP RAM LOCATION
0025                  *  E TEMPORARY POINTER (JUMP, MSG, GLTCH,PACK)
0026                  *    PRINTER INTERFACE DATA
0027                  *  F MEMORY ADDRESS POINTER
0028                  *
0029                  ********************************************
0030                  *
0031                  *     RAM MEMORY USAGE
0032                  *    ****************
0033                  *
0034                  *   :C000,:C001,:C002,:C003    TEMP.
0035                  *   :C005 - :C010 ' start      '.
0036                  *   :C010 START OF TEXT   (SOT)
0037                  *   :EFFF END OF MEMORY   (EOM)
```

```
0038                          *    ;C011 FIRST TEXT BYTE
0039                          *
0040                          *
0041                          *************************************
0042                          *
0043 0000                          ORG   0
0044                          *
0045                          * REGISTER INITIALISATION
0046                          *
0047                          TEMP  EQU   :C000
0048                          SOT   EQU   :C010     START OF TEXT MEMORY
0049                          *
0050 0000 F8 C0 BD       ENTRY LOAD  D,TEMP
     0003 F8 00 AD
0051 0006 F8 C0                LDI   SOT.H     LOAD F,6,7 WITH SOT
0052 0008 BF                   PHI   F
0053 0009 B7                   PHI   7
0054 000A B6                   PHI   6
0055 000B F8 10                LDI   SOT.L
0056 000D AF                   PLO   F
0057 000E A7                   PLO   7
0058 000F A6                   PLO   6
0059 0010 F8 03 B1             LOAD  1,DISP    SUBROUTINE ADDRESSES
     0013 F8 62 A1
0060 0016 F8 02 B2             LOAD  2,GETCH
     0019 F8 6C A2
0061 001C F8 00                LDI   0
0062 001E B8                   PHI   8
0063 001F A9                   PLO   9
0064 0020 B9                   PHI   9
0065 0021 BB                   PHI   B        RESET MARGIN
0066                          *
0067 0022 E0                   SEX   0
0068 0023 67                   OUT   7
0069 0024 00                   DATA  0
,0070                          *
0071 0025 F8 00 B4             LOAD  4,MSG
     0028 F8 D4 A4
0072 002B F8 40 BE             LOAD  E,:400B   DISPLAY
     002E F8 0B AE
0073 0031 D4                   SEP   4        WRITE TO DISPLAY
0074 0032                      ASCI  1
0075 0032 CD C9 C3             DATA  'MICRO-WRITER'
     0035 D2 CF AD
     0038 D7 D2 C9
     003B D4 C5 D2
0076 003E F8 C0 BE             LOAD  E,SOT
     0041 F8 10 AE
0077 0044 D4                   SEP   4        PUT START IN MEMORY
0078 0045                      ASCI  0
0079 0045 20 20 20             DATA  '   trats '
     0048 20 20 20
     004B 74 72 61
     004E 74 73 20
0080                          *
0081 0051 D2              WFS  SEP   2        WAIT FOR A CHARACTER
0082 0052 32 51                BZ    WFS
0083 0054 30 68                BR    MAIN2
0084                          *************************************
0085                          * START
0086                          *
0087 0056 F8 C0 FF       START LOAD F,SOT
     0059 F8 10 AF
0088 005C 9F             VSTRT GHI   F        COPY F TO 6&7 FOR VDU
0089 005D B6                   PHI   6
0090 005E B7                   PHI   7
0091 005F 8F                   GLO   F
0092 0060 A6                   PLO   6
0093 0061 A7                   PLO   7
0094                          *
0095 0062 F8 00          MAIN  LDI   0
0096 0064 A5                   PLO   5        FLAG FOR GDS
0097 0065 C0 05 6D             LBR   GDS      GETCH/DISPLAY
```

```
0098
0099                        *
0100 0068   88      MAIN2 GLO   8       RETRIEVE CHAR.
0101 0069   FE            SHL
0102 006A   33 97          BDF   MCONT   CONTROL ?
0103 006C   1F             INC   F
0104 006D   9F             GHI   F
0105 006E   FD E0          SDI   :E0     END OF MEMORY ?
0106 0070   32 76          BZ    MFULL
0107 0072   88      MSTORE GLO   8       GET CHAR
0108 0073   5F             STR   F
0109 0074   30 62          BR    MAIN
0110                ***********************************
0111                *
0112 0076   2F      MFULL DEC   F
0113 0077   F8 00 B4       LOAD  4,MSG
     007A   F8 B4 A4
0114 007D   F8 40 BE       LOAD  E,:400B
     0080   F8 0B AE
0115 0083   D4             SEP   4
0116 0084          ASCI 1
0117 0084   CD C5 CD       DATA  'MEMORY FULL '
     0087   CF D2 D9
     008A   A0 C6 D5
     008D   CC CC A0
0118 0090          ASCI 0
0119 0090   D2      MF1   SEP   2
0120 0091   FB FF         XRI   :FF      WAIT FOR HALT
0121 0093   3A 90         BNZ   MF1
0122 0095   30 62         BR    MAIN
0123                *
0124 0097   FE     MCONT SHL
0125 0098   33 62         BDF   MAIN     HALT ?
0126 009A   F6            SHR
0127 009B   5D            STR   D        SAVE VALUE IN TEMP
0128 009C   ED            SEX   D
0129 009D   F8 00 BE      LOAD  E,JMPT   SET UP FOR JUMP TABLE
     00A0   F8 A4 AE
0130 00A3   DE            SEP   E
0131 00A4   F8 DE  JMPT  LDI   JTABL.L
0132 00A6   F4            ADD
0133 00A7   AC            PLO   C
0134 00A8   F8 00         LDI   JTABL.H
0135 00AA   7C 00         ADCI  0
0136 00AC   BC            PHI   C        C CONTAINS ADDRESS OF ENTRY IN JUMP TABLE
0137 00AD   EC            SEX   C
0138 00AE   72            LDXA
0139 00AF   B0            PHI   0
0140 00B0   F0            LDX
0141 00B1   A0            PLO   0        0 CONTAINS JUMP ADDRESS
0142 00B2   D0            SEP   0        AND OFF WE GO
0143                *
0144
0145                ***********************************
0146                *
0147                * MESSAGE SUBROUTINE
0148                *
0149                * ENTER WITH E REGISTER POINTING AT HIGHEST ADDRESS TO BE WRITTEN TO
0150                *
0151                * LOAD E,ADDR TOP OF DISPLAY OR MEMORY
0152                * LOAD 4,MSG SUB ADDRESS
0153                * SEP 4
0154                * MESSAGE OF 12 CHARACTERS
0155                * RETURN
0156                *
0157 00B3   D0     MSGX   SEP   0        RETURN
0158 00B4   F8 0C  MSG    LDI   12
0159 00B6   A3            PLO   3        LOOP COUNT
0160 00B7   F8 00  MSGLP  LDI   0
0161 00B9   5E            STR   E        TO RESET CURSORS
0162 00BA   E0            SEX   0        PC USED AS INDEX
0163 00BB   72            LDXA           GET CHAR FROM MESSAGE
0164 00BC   EE            SEX   E
```

```
0165 00BD  73              STXD
0166 00BE  23              DEC   3
0167 00BF  83              GLO   3
0168 00C0  3A B7           BNZ   MSGLP      FINISHED ?
0169 00C2  30 B3           BR    MSGX       RETURN
0170                 *
0171                 *
0172                 ***********************************************
0173                 * INCREMENT POINTER
0174                 * GIVES SHORT RETURN FOR VALID CHAR.
0175                 * GIVES LONG RETURN FOR:-
0176                 *   END CODE                D=:06, DF=0
0177                 *   EOM                     D=:00, DF=0
0178                 *   NULL (END OF DATA)      D=:Cx, DF=1
0179                 *
0180                 *
0181 00C4  D0        IPEX  SEP   0
0182 00C5  1F        INCPT INC   F          INC MEMA
0183 00C6  9F              GHI   F
0184 00C7  FD E0           SDI   :E0        END OF MEMORY ?
0185 00C9  3A D1           BNZ   IP1        NO
0186 00CB  2F        IP3   DEC   F          YES, PREVENT FORWARD MOVEMENT
0187 00CC  FE        IP4   SHL              SET DF FLAG
0188 00CD  10              INC   0
0189 00CE  10              INC   0          BUMP RETURN ADDRESS FOR LONG RETURN
0190 00CF  30 C4           BR    IPEX       RETURN
0191                 *
0192 00D1  0F        IP1   LDN   F          GET CHAR VIA MEMA
0193 00D2  3A D7           BNZ   IP2
0194 00D4  84              GLO   4          NULL, SET D & DF FLAG TO 1
0195 00D5  30 CB           BR    IP3        LONG RETURN
0196                 *
0197 00D7  FD 3C     IP2   SDI   :3C        END CODE?
0198 00D9  3A C4           BNZ   IPEX       NO, VALID SHORT RETURN
0199 00DB  91              GHI   1          YES, SET D & DF FLAG TO 0
0200 00DC  30 CC           BR    IP4        LONG RETURN
0201                 *
0202                 *
0203                 ***********************************************
0204                 *
0205 00DE  01 10     JTAPL DD    BACKS      BACKWARDS 1 CHAR.
0206 00E0  01 5D           DD    BACKC      BACKWARDS CONTINUOUS
0207 00E2  01 2A           DD    JMPS       JUMP BACK 128 CHARS.
0208 00E4  01 2E           DD    JMPL       JUMP BACK TO START CODE OF SCT  A.
0209 00E6  01 1E           DD    ZIPS       ZIP FORWARD 128 CHARS. OR TO END OF DAT
0210 00E8  01 1F           DD    ZIPL       ZIP FORWARD TO START CODE OR TO END OF
0211 00EA  04 19           DD    PRIN1      PRINT (SINGLE LF)                DATA
0212 00EC  04 1D           DD    PRIN2      PRINT (DOUBLE LF)
0213 00EE  01 F2           DD    INSRT      INSERT
0214 00F0  06 FE           DD    CASSR      CASSETTE READ
0215 00F2  01 8F           DD    WIPE       WIPE DATA BETWEEN START & END CODES (OR
0216 00F4  06 8A           DD    CASSW      CASSETTE WRITE                   EOM)
0217 00F6  01 DA           DD    DELS       DELETE SINGLE CHARACTER
0218 00F8  01 C5           DD    DELC       DELETE CONTINUOUS
0219 00FA  00 FE           DD    FORWS      FORWARD SINGLE CHARACTER
0220 00FC  01 55           DD    FORWC      FORWARDS CONTINUOUS
0221                 ***********************************************
0222                 *
0223                 * FORWARDS SINGLE
0224                 *
0225 00FE  F8 00 B4  FORWS LOAD  4,INCPT    SUBR CALL
     0101  F8 C5 A4
0226 0104  D4              SEP   4
0227 0105  C4              NOP
0228 0106  C4              NOP              VALID CHAR
0229 0107  0F        VTST  LDN   F
0230 0108  FF 3E           XRI   '>'        START ?
0231 010A  CA 00 62        LBNZ  MAIN
0232 010D  C0 00 5C        LBR   VSTPT
0233                 ***********************************************
0234                 * BACKWARDS SINGLE
0235                 *
0236 0110  F8 01 B4  BACKS LOAD  4,DECPT
```

```
         0113  F8 79 A4
0237 0116  D4                  SEP    4
0238 0117  C4                  NOP
0239 0118  C4                  NOP
0240 0119  30 07               BR     VTST
0241                  ********************************************
0242                  * ZIP
0243                  *
0244 011B  F8 80      ZIPS     LDI    128         LIMIT OF 128 CHARS
0245 011D  30 21               BR     ZIP
0246                  ******************
0247 011F  F8 00      ZIPL     LDI    0           NO LIMIT
0248 0121  A3         ZIP      PLO    3
0249 0122  F8 00 B4            LOAD   4,INCPT
     0125  F8 C5 A4
0250 0128  30 37               BR     ZPJM
0251                  ********************************************
0252 012A  F8 80      JMPS     LDI    128         LIMIT OF 128 CHARS
0253 012C  30 30               BR     JMP
0254                  ******************
0255 012E  F8 00      JMPL     LDI    0           NO LIMIT
0256 0130  A3         JMP      PLO    3           SAVE LOOP COUNT
0257 0131  F8 01 B4            LOAD   4,DECPT
     0134  F8 79 A4
0258 0137  F8 00      ZPJM     LDI    0
0259 0139  B3                  PHI    3
0260 013A  FE                  SHL                RESET DF
0261 013B  D4         ZPJ2     SEP    4           CALL INC/DEC PT
0262 013C  30 45               BR     ZJ1+2       VALID CHAR.
0263 013E  3A 43               BNZ    ZJ1         START OR END CODE
0264 0140  C0 00 56            LBR    START       SOT OR EOM
0265                  *
0266 0143  33 52      ZJ1      BDF    ZJ3         NULL, END OF DATA
0267 0145  0F                  LDN    F
0268 0146  FB 3E               XRI    :3E         START CODE ?
0269 0148  C2 00 5C            LBZ    VSTPT
0270 014B  23                  DEC    3           DECREMENT LOOP COUNT
0271 014C  83                  GLO    3           TEST
0272 014D  3A 3B               BNZ    ZPJ2
0273 014F  93                  GHI    3
0274 0150  3A 3B               BNZ    ZPJ2
0275 0152  C0 00 62   ZJ3      LBR    MAIN        COUNT EXPIRED, 128 CHARS.
0276                  ********************************************
0277                  *
0278                  * FORWARDS CONTINUOUS
0279                  *
0280 0155  F8 00 B4   FORWC    LOAD   4,INCPT
     0158  F8 C5 A4
0281 015B  30 65               BR     CONT
0282                  ********************************************
0283                  *
0284                  * BACKWARDS CONTINUOUS
0285 015D  F8 01 B4   BACKC    LOAD   4,DECPT
     0160  F8 79 A4
0286 0163  30 65               BR     CONT
0287                  ********************************************
0288                  *
0289                  * CONTINUOUS MODE
0290                  *
0291 0165  F8 02      CONT     LDI    2
0292 0167  AA                  PLO    A           SET EXT DELAY
0293 0168  D4                  SEP    4           CALL INC OR DEC POINTER
0294 0169  30 6D               BR     CNL1        VALID CHAR - CONTINUE
0295 016B  30 07      CNLM     BR     VTST        START OF END
0296 016D  D1         CNL1     SEP    1           CALL DISPLAY
0297 016E  8A                  GLO    A           GET EXT DELAY
0298 016F  32 65               BZ     CONT        DELAY OVER ?
0299 0171  D2                  SEP    2           CALL GET CHAR
0300 0172  FF FF               SMI    :FF         HALT ?
0301 0174  3A 6D               BNZ    CNL1
0302 0176  30 6B               BR     CNLM        YES
0303                  ********************************************
0304                  * DECREMENT POINTER
```

```
0305                      * NORMALLY GIVES SHORT RETURN
0306                      * AT START CODE OF START OF MEMORY GIVES LONG RETURN
0307                      *
0308 0178  D0        DPEX   SEP   0
0309 0179  9F        DECPT  GHI   F
0310 017A  FD C0            SDI   SOT.H        START OF MEMORY ?
0311 017C  3A 83            BNZ   DP1
0312 017E  8F               GLO   F
0313 017F  FD 10            SDI   SOT.L        START OF MEMORY ?
0314 0181  32 8A            BZ    DP2
0315 0183  2F        DP1    DEC   F
0316 0184  0F               LDN   F            GET CHAR
0317 0185  FD 3E            SDI   :3E          START CODE ?
0318 0187  3A 8D            BNZ   DP3
0319 0189  94               GHI   4            YES, SET D FOR START CODE
0320 018A  FE        DP2    SHL                RESET DF FLAG
0321 018B  1C               INC   C
0322 018C  1C               INC   C            DUMP RETURN
0323 018D  30 78     DP3    BR    DPEX
0324                      **********************************************
0325                      * WIPE
0326                      *
0327 018F  D2        WIPE   SEP   2            GET CHARACTER
0328 0190  32 8F            BZ    WIPE
0329 0192  FB 8A            XRI   :8A          REPEATED CONTROL - W ?
0330 0194  CA 00 62         LBNZ  MAIN
0331 0197  1F               INC   F
0332 0198  F8 01 B4         LOAD  4,DECPT
     019B  F8 79 A4
0333 019E  D4        WPLP   SEP   4            LOOK BACK FOR START
0334 019F  30 9E            BR    WPLP         VALID CHAR.
0335 01A1  3F A4            BNZ   WIPE1        START CODE
0336 01A3  1F               INC   F            NO - MUST BE SOT
0337                      *
0338 01A4  8F        WIPE1  GLO   F            TRANSFER MEMORY POINTER TO E
0339 01A5  AE               PLO   E
0340 01A6  9F               GHI   F
0341 01A7  BE               PHI   E
0342 01A8  0E        WLP    LDN   E            GET CHARACTER
0343 01A9  FB 3C            XRI   :3C          END CODE ?
0344 01AB  32 B6            BZ    WEND
0345 01AD  F8 00            LDI   0            NO
0346 01AF  5E               STR   E            CLEAR CHARACTER
0347 01B0  1E               INC   E
0348 01B1  9E               GHI   E
0349 01B2  FD E0            SDI   :E0          END OF MEMORY ?
0350 01B4  3A A8            BNZ   WLP
0351 01B6  5E        WEND   STR   E
0352 01B7  2F               DEC   F
0353 01B8  30 DA            BR    PACKJ
0354                      **********************************************
0355                      * DELETE SINGLE
0356                      *
0357 01BA  F8 01 B4  DELS   LOAD  4,DEL
     01BD  F8 BE A4
0358 01C0  D4               SEP   4
0359 01C1  30 DA            BR    PACKJ
0360 01C3  30 DA            BR    PACKJ
0361                      **********************************************
0362                      * DELETE CONTINUOUS
0363                      *
0364 01C5  F8 01 B4  DELC   LOAD  4,DEL
     01C8  F8 BE A4
0365 01CB  F8 02     DELC1  LDI   2
0366 01CD  AA               PLO   A            EXT DELAY
0367 01CE  D4               SEP   4
0368 01CF  30 DA            BR    PACKJ
0369 01D1  D1        DELC2  SEP   1            DISPLAY
0370 01D2  8A               GLO   A            EXT DELAY
0371 01D3  32 CB            BZ    DELC1
0372 01D5  D2               SEP   2            GETCH
0373 01D6  FF FF            SMI   :FF          HALT ?
0374 01D8  3A D1            BNZ   DELC2
```

```
0375 01DA  C0 02 50   PACKJ LBR  PACK
0376                  **************************************************
0377                  * DELETE ROUTINE
0378                  *
0379 01DD  D0         DELEX SEP  0
0380 01DE  9F         DEL   GHI  F
0381 01DF  FD C0            SDI  SOT.H      TEST START OF MEMORY
0382 01E1  3A EA            BNZ  DEL1
0383 01E3  8F               GLO  F
0384 01E4  FD 10            SDI  SOT.L
0385 01E6  3A EA            BNZ  DEL1
0386 01E8  30 DD            BR   DELEX
0387 01EA  F8 00      DEL1  LDI  0
0388 01EC  5F               STR  F          CLEAR CHARACTER
0389 01ED  2F               DEC  F
0390 01EE  10               INC  0
0391 01EF  10               INC  0          LONG RETURN
0392 01F0  30 DD            BR   DELEX
0393                  *
0394                  **************************************************
0395                  * INSERT
0396                  *
0397                  * OPENS A GAP
0398                  * ACCEPTS INPUT TEXT
0399                  * MEMORY CONTENTS ARE THEN PACKED DOWN
0400                  *
0401 01F2  F8 FF      INSPT LDI  :FF        C & E TO END OF MEMORY
0402 01F4  AC               PLO  C
0403 01F5  AE               PLO  E
0404 01F6  F8 DF            LDI  :DF
0405 01F8  BC               PHI  C
0406 01F9  BE               PHI  E
0407 01FA  ED               SEX  D
0408 01FB  8F         PULP  GLO  F          HAS C REACHED F YET ?
0409 01FC  5D               STR  D
0410 01FD  8C               GLO  C
0411 01FE  F7               SM
0412 01FF  3A 07            BNZ  PU1
0413 0201  9F               GHI  F
0414 0202  5D               STR  D
0415 0203  9C               GHI  C
0416 0204  F7               SM
0417 0205  32 15            BZ   INSLP      YES - PACK UP COMPLETED
0418 0207  0C         PU1   LDN  C          GET CHARACTER THROUGH C
0419 0208  32 11            BZ   PU2
0420 020A  5D               STR  D          SAVE
0421 020B  F8 00            LDI  0
0422 020D  5C               STR  C          CLEAR CHARACTER
0423 020E  0D               LDN  D
0424 020F  5E               STR  E          STORE THROUGH E
0425 0210  2E               DEC  E
0426 0211  2C         PU2   DEC  C
0427 0212  C0 01 FB         LBR  PULP
0428                  *
0429 0215  1F         INSLP INC  F
0430 0216  9F               GHI  F
0431 0217  FD E0            SDI  :E0        END OF MEMORY ?
0432 0219  C2 00 76         LBZ  MFULL
0433 021C  0F               LDN  F
0434 021D  CA 00 76         LBNZ MFULL      TEST FOR MEMORY CLEAR
0435 0220  F8 01      INSL5 LDI  1          FLASHING SPACE
0436 0222  5F               STR  F
0437 0223  A5         INSL1 PLO  5          FLAG FOR GDS
0438 0224  C0 05 6D         LBR  GDS        GETCH/DISPLAY
0439                  *
0440                  *
0441 0227  8E         INSL3 GLO  E          RETRIEVE CHAR.
0442 0228  FE               SHL             SHIFT TO
0443 0229  33 2F            BDF  INSC       TEST FOR CONTROL
0444 022B  8E               GLO  E          YES, GET CHARACTER
0445 022C  5F               STR  F          AND STORE
0446 022D  30 15            BR   INSLP
0447 022F  F8 12      INSC  LDI  :12        SHIFTED READ CASSETTE
```

```
0448 0231   C2 06 F6         LBZ   CASSI
0449 0234   8E               GLO   E
0450 0235   FB FE            XRI   :FE      END INSERT
0451 0237   3A 3D            BNZ   INSL4    NO
0452 0239   5F               STR   F        YES, REPLACE FLASHING SPACE
0453 023A   2F               DEC   F
0454 023B   30 50            BR    PACK
0455                         *
0456 023D   8E        INSL4  GLO   E
0457 023E   FB 8C            XRI   :8C      DELETE?
0458 0240   3A 23            BNZ   INSL1    NO, IGNORE OTHER CONTROL CODES
0459 0242   5F               STR   F        YES, CLEAR CHAR.
0460 0243   2F               DEC   F
0461 0244   9F               GHI   F        TEST MEMA
0462 0245   FD C0            SDI   SOT.H    FOR SOT
0463 0247   3A 20            BNZ   INSL5    NO
0464 0249   8F               GLO   F
0465 024A   FD 10            SDI   SOT.L
0466 024C   3A 20            BNZ   INSL5    NO
0467 024E   30 15            BR    INSLP    YES; INCR. MEMA
0468                         **************************************
0469                         * PACK
0470                         * PACKS DOWN MEMORY CONTENTS, REMOVING ZEROS
0471                         *
0472 0250   F8 C0     PACK   LDI   SOT.H    PUT SOT IN C & E
0473 0252   BC               PHI   C
0474 0253   BE               PHI   E
0475 0254   F8 10            LDI   SOT.L
0476 0256   AC               PLO   C
0477 0257   AE               PLO   E
0478 0258   0C        PDLP   LDN   C        LOAD THROUGH C
0479 0259   32 62            BZ    PD1      IGNORE IF ZERO
0480 025B   5D               STR   D        IF NOT SAVE
0481 025C   F8 00            LDI   0
0482 025E   5C               STR   C        CLEAR OUT CHARACTER
0483 025F   0D               LDN   D
0484 0260   5E               STR   E        STORE THROUGH E
0485 0261   1E               INC   E        INCREMENT E
0486 0262   1C        PD1    INC   C        INCREMENT C
0487 0263   9C               GHI   C
0488 0264   FD E0            SDI   :E0      END OF MEMORY ?
0489 0266   3A 58            BNZ   PDLP
0490 0268   C0 00 62         LBR   MAIN
0491                         *
0492                         ***********************************
0493                         *
0494                         * GET CHARACTER SUBROUTINE
0495                         *
0496                         * RETURNS WITH 0 IF A CHARACTER IS NOT READY
0497                         * OTHERWISE RETURNS WITH CHARACTER IN D AND 8L
0498                         * CONTROL CODES HAVE BIT 8 SET
0499                         *
0500 026B   D0        GCHX   SEP   0        RETURN
0501 026C   ED        GETCH  SEX   D        X ADDRESSES TEMP
0502 026D   9E               GHI   E        KEY PRESSED ?
0503 026E   3A 7A            BNZ   GCH0
0504 0270   34 6B            LI    GCHX     TEST IF KEY IS PRESSED
0505 0272   69        GCHB   INP   1        INPUT KEYS
0506 0273   9E               GHI   E
0507 0274   F1               OR             BUILD CHARACTER
0508 0275   B8               PHI   8        SAVE SKELETON
0509 0276   F8 00            LDI   0        CHAR NOT READY YET
0510 0278   30 6B            BR    GCHX
0511 027A   3C 72     GCH0   BN1   GCHB     KEY STILL PRESSED ?
0512 027C   F8 00            LDI   0
0513 027E   A8               PLO   8        CLEAR LAST CHAR
0514 027F   98               GHI   8        NO - GET COMPLETED CHARACTER
0515 0280   FA 3F            ANI   :3F      REMOVE BITS 6&7
0516 0282   F6               SHR            SHIFT OUT CONTROL BIT
0517 0283   B8               PHI   8        SAVE
0518 0284   33 B1            BDF   GCC      CONTROL ?
0519 0286   89               GLO   9        GET MODE
0520 0287   F6               SHR
```

```
0521 0288  33 A7            BDF   GA20     TEMP UC ?
0522 028A  F6               SHR
0523 028B  33 AC            BDF   GA40     NUM ?
0524 028D  F6               SHR
0525 028E  33 A7            BDF   GA20     UC LOCK ?
0526 0290  98               GHI   6        NO - GET CHARACTER
0527 0291  5D        GTRAN  STR   D        STORE SHIFTED CODE
0528 0292  F8 F1            LDI   LUT.L
0529 0294  F4               ADD            CODE TO LUT ADDRESS
0530 0295  AE               PLO   E
0531 0296  F8 02            LDI   LUT.H
0532 0298  7C 00            ADCI  0
0533 029A  BE               PHI   E        ADDRESS IN LUT IN E
0534 029B  0E               LDN   E        GET TRANSLATED CHARACTER
0535 029C  A6               PLO   6        PUT IN CHAR STORE
0536 029D  89               GLO   9        MODE
0537 029E  FA FE     GCX1   ANI   :FE      RESET TEMP UC
0538 02A0  A9        GCX2   PLO   9        SAVE MODE
0539 02A1  F8 00            LDI   0
0540 02A3  B6               PHI   6        RESET KEY PRESSED FLAG
0541 02A4  86               GLO   6        GET CHARACTER
0542 02A5  30 6D            BR    GCHX     AND EXIT
0543                  *
0544 02A7  98        GA20   GHI   6
0545 02A8  FC 20            ADI   :20      ALL FOR UC
0546 02AA  30 91            BR    GTRAN
0547 02AC  98        GA40   GHI   6
0548 02AD  FC 40            ADI   :40      NUM
0549 02AF  30 91            BR    GTRAN
0550                  *
0551 02B1  32 D2     GCC    BZ    GCS      SPACE
0552 02B3  98               GHI   6        CONTROL CODE
0553 02B4  FF 09            XRI   9        Y
0554 02B6  32 CD            BZ    GCY
0555 02B8  98               GHI   6
0556 02B9  FF 1F            XRI   :1F      P
0557 02BB  32 D7            BZ    GCP
0558 02BD  89               GLO   9
0559 02BE  F6               SHR
0560 02BF  98               GHI   6
0561 02C0  3B C4            BNF   GCC1     TEMP UC ?
0562 02C2  FC 20            ADI   :20      YES
0563 02C4  F6        GCC1   SHR
0564 02C5  3B C9            BNF   GCC2
0565 02C7  FC 02            ADI   2        FILL IN GAP OF THUMB KEY
0566 02C9  FC 60     GCC2   ADI   :60
0567 02CB  30 91            BR    GTRAN
0568                  *
0569 02CD  89        GCY    GLO   9
0570 02CE  F9 01            ORI   1        SET TEMP UC
0571 02D0  30 A0            BR    GCX2
0572 02D2  89        GCS    GLO   9
0573 02D3  FB 02            XRI   2        TOGGLE NUM
0574 02D5  30 9E            BR    GCX1
0575 02D7  89        GCP    GLO   9
0576 02D8  F6               SHR
0577 02D9  F8 00            LDI   0
0578 02DB  33 A0            BDF   GCX2     TEMP UC ? IF YES SET LC
0579 02DD  F8 04            LDI   4        UC LOCK
0580 02DF  30 A0            BR    GCX2
0581                  *
0582                  *
0583                  ****************************************
0584                  * ASCI LOOK UP TABLE
0585                  *
0586 02E1  20 73 65  LUT    DATA '      set kircn.a.cyciugv,hjlwqb-rzx','''','L'
     02E4  74 20 6B                                                            LC
     02E7  69 72 6F
     02EA  6E 61 2E
     02ED  63 79 64
     02F0  6E 75 67
     02F3  76 2C 6E
     02F6  6A 6C 77
```

```
         02F9  71 62 2D
         02FC  6D 7A 78
         02FF  27 70
0587 0301  20 53 45        DATA '        SET KIRCNA.CYDFUGV,HJLVQP-MZX',''','F'
     0304  54 20 4F                                                        UC
     0307  49 52 4F
     030A  4E 41 2F
     030D  43 59 44
     0310  46 55 47
     0313  56 2C 48
     0316  4A 4C 57
     0319  51 42 2D
     031C  4D 5A 58
     031F  27 50
0588 0321  20 24 31        DATA '        $1+ /2;0'*.(?34678,-=1:)8!9%X@5' RUN
     0324  2B 20 2F
     0327  32 3B 30
     032A  22 2A 2E
     032D  28 3F 33
     0330  34 36 37
     0333  26 2C 2D
     0336  3D 23 3A
     0339  29 3B 21
     033C  39 25 58
     033F  40 35
0589 0341  00 88 80        DATA 0,:88,:80,'^','(',:8C,0,:8E CONTROL
     0344  5E 5D 8C
     0347  00 8E
0590 0349  FF 3D 82        DATA :FF,')',:82,:8A,:84,:A,:86,0
     034C  8A 84 0A
     034F  86 00
0591 0351  00 FE 81        DATA 0,:FE,:81,:89,'(',:8D,0,:8F
     0354  89 5B 8D
     0357  00 8F
0592 0359  FF 3C 83        DATA :FF,'<',:83,:8B,:85,:9,:87,0
     035C  8B 85 09
     035F  87 00
0593                *
0594                ************************************************************
0595                *
0596                * DISPLAY
0597                *
0598                *
0599 0361  D0             DISPEX SEP  C
0600 0362  F8 3F BE       DISP  LOAD E,:3FFF   DISPLAY ADRESS
     0365  F8 FF AE
0601 0368  9F                    GHI   F
0602 0369  FC                    PHI   C
0603 036A  8F                    GLO   F
0604 036B  AC                    PLO   C       RC=MEMA
0605 036C  F8 00                 LDI   0
0606 036E  AF                    PLO   F       RESET CURSOR MASK
0607 036F  ED                    SEX   D       TEMP
0608 0370  99                    GHI   9       CHAR / CURSOR
0609 0371  FE                    SHL
0610 0372  3B AD                 BNF   DL1     CHARACTERS
0611                *
0612 0374  F8 01          DL3    LDI   1       RESET
0613 0376  B3                    PHI   3       CURSOR MASK
0614 0377  F8 00                 LDI   0
0615 0379  5D                    STR   D       RESET CURSOR DATA
0616 037A  1D             DL4    INC   D
0617 037B  0C                    LDN   C       GET CHAR FROM MEMORY
0618 037C  FF 20                 SMI   :20     CONTROL?
0619 037E  3B 88                 BNF   FLASH   YES
0620 0380  FF 21                 SMI   :21     UC?
0621 0382  3B 8E                 BNF   DL2     YES
0622 0384  FF 1A                 SMI   :1A     UC?
0623 0386  33 8F                 BDF   DL2     NO
0624                *
0625 0388  93             FLASH  GHI   3       YES - GET CURSOR MASK
0626 0389  F1                    OR            MASK OR DATA
0627 038A  5D                    STR   D       REPLACE CURSOR DATA
```

```
0628 038B  2C        DL2    DEC   C
0629 038C  93               GHI   3
0630 038D  FE               SHL         SHIFT CURSOR MASK
0631 038E  F3               PHI   3
0632 038F  FB 10            XRI   :10   5 TH BIT ?
0633 0391  3A 7A            BNZ   DL4   NOT YET
0634                  *
0635 0393  8E               GLO   E     YES
0636 0394  FB 0B            XRI   :0B   RE=:400B (TWELFTH CHAR)?
0637 0396  32 9C            BZ    DL5   YES
0638                  *
0639 0398  0D               LDN   D     CURSOR DATA
0640 0399  5E               STR   E     DISPLAY
0641 039A  30 74            BR    DL3   NEXT 4 BITS
0642                  *
0643 039C  F8 07     DL5    LDI   :07   LEFT CURSOR OFF MASK
0644 039E  C5               LSNQ        BATT. CK - NO CHANGE
0645                  *
0646 039F  F2               AND         CHARGE LEVEL,TURN OFF LEFT CURSOR
0647 03A0  5D               STR   D
0648                  *
0649 03A1  89               GLO   9     ALPH/NUM FLAG
0650 03A2  F6               SHR
0651 03A3  F6               SHR         TEST
0652 03A4  F8 08            LDI   :08   LEFT CURSOR ON MASK
0653 03A6  C7               LSNF        ALPHA, NO CHANGE
0654                  *
0655 03A7  F1               OR          NUM, TURN ON LEFT CURSOR
0656 03A8  5D               STR   D
0657                  *
0658 03A9  0D               LDN   D     RETRIEVE CURSOR DATA
0659 03AA  5E               STR   E     & SEND TO DISPLAY
0660 03AB  30 DA            BR    DDEL
0661                  *
0662                  *
0663 03AD  1E        DL1    INC   E
0664 03AE  0C               LDN   C     GET CHAR
0665 03AF  FF 20            SMI   :20   CONTROL?
0666 03B1  3B BE            BNF   DL9   YES
0667 03B3  FF 40            SMI   :40   UC?
0668 03B5  3B B9            BNF   DL10  YES
0669 03B7  FF 20            SMI   :20   LOWER CASE
0670 03B9  FC 21     DL10   ADI   :21
0671 03BB  FC BF     DL9    ADI   :BF   CORRECT TO UC ASCII + 8TH BIT
0672 03BD  2C               DEC   C
0673 03BE  A3               PLO   3     SAVE DATA
0674 03BF  89               GLO   9     ALPH/NUM FLAG
0675 03C0  F6               SHR
0676 03C1  F6               SHR         TEST
0677 03C2  3B CC            BNF   DL16  ALPHA
0678                  *
0679 03C4  8E               GLO   E
0680 03C5  FB 07            XRI   :07   RE>=:4008?
0681 03C7  F8 08            LDI   :08   LEFT CURSOR ON MASK
0682 03C9  33 CC            BDF   DL16  ALPHA, DO NOT CHANGE MASK
0683 03CB  AB               PLO   E     NUMERIC, CURSOR ON
0684                  *
0685                  *
0686 03CC  8E        DL16   GLO   E     RETRIEVE CURSOR DATA
0687 03CD  5E               STR   E     SEND TO DISPLAY
0688 03CE  83               GLO   3     RETRIEVE DATA
0689 03CF  5E               STR   E     SEND TO DISPLAY
0690                  *
0691 03D0  8E               GLO   E
0692 03D1  FB 0B            XRI   :0B   RE=:400B (LAST CHAR)?
0693 03D3  3A AD            BNZ   DL1   NO, PROCEED AS NORMAL
0694 03D5  30 LA            BR    DDEL  YES,TEST BATTERY LEVEL
0695                  *
0696 03D7  F8 A1            LDI   :A1   FIRST LEVEL '!'
0697 03D9  5E               STR   E     TO DISPLAY
0698                  *
0699 03DA  99        DDEL   GHI   9
0700 03DB  FF 01            SMI   1     DEC DELAY
```

```
0701 03DD FE              SHL            TEST EXPIRED MODE
0702 03DE CA 03 EB         LBNZ DL6       NOT EXPIRED
0703                *
0704 03E1 F8 28            LDI  :28       SET CHAR. DELAY
0705 03E3 CB 03 E8         LBNF DL7       WAS CHAR MODE
0706                *
0707 03E6 2A              DEC  A         WAS CURSOR MODE, DECR EXT DELAY
0708 03E7 C8              LSKP
0709 03E8 FC 60    DL7    ADI  :60       CONVERT TO CURSOR MODE
0710 03EA FE              SHL
0711                *
0712 03EB 76      DL6    PSHR           RESTORE DELAY + DF
0713 03EC B9              PHI  9         REPLACE DELAY
0714 03ED C0 03 61         LBR  DISPEX    AND EXIT
0715                *
0716                ************************************************
0717                *
0718                * VDU ROUTINES
0719                *
0720 03F0 F8 05 B4  VDU   LOAD 4,VCHAR
     03F3 F8 C1 A4
0721 03F6 F8 04 B5        LOAD 5,VBYTE
     03F9 F8 EB A5
0722 03FC 9A               GHI  A
0723 03FD CA 04 09         LBNZ V1        'PRINT' 1 OR 2 ?
0724 0400 97               GLI  7
0725 0401 C2 00 62         LBZ  MAIN      0 FOR END CODE - IGNORE
0726 0404 27               DEC  7
0727 0405 97               GHI  7
0728 0406 B6               PHI  6         COPY 7 TO 6
0729 0407 87               GLO  7
0730 0408 A6               PLO  6
0731 0409 F8 09    V1     LDI  9         SET
0732 040B A7               PLO  7         LINE COUNT TO 9
0733 040C 96               GHI  6         COPY 6 TO F
0734 040D BF               PHI  F
0735 040E 86               GLO  6
0736 040F AF               PLO  F
0737 0410 9A               GHI  A
0738 0411 32 C6            BZ   CRLF      'PRINT' 1
0739 0413 F8 00            LDI  0         ZERO
0740 0415 BA               PHI  A         TO PREVENT DOUBLE SPACE
0741 0416 27               DEC  7         8 LINES FIRST TIME
0742 0417 30 5C            BR   FF
0743                *
0744                *
0745                ************************************************
0746                *
0747                * PRINT ROUTINES
0748                *
0749
0750 0419 F8 00    PRIN1  LDI  0
0751 041B 30 1F            BR   PRIN3
0752 041D F8 01    PRIN2  LDI  1
0753 041F BA       PRIN3  PHI  A         LINE SPACE
0754 0420 3E 25            BN3  PRINO
0755 0422 C0 03 F0         LBR  VDU       PRINTER OR VDU ?
0756                *
0757 0425 F8 00 B4  PRINO LOAD 4,MSG
     0428 F8 D4 A4
0758 042B F8 40 BE        LOAD E,:400B
     042E F8 0B AE
0759 0431 D4               SEP  4
0760 0432                  ASCI 1
0761 0432 D0 D2 C9         DATA 'PRINT  LEV 8 '
     0435 CE D4 A0
     0438 CC C5 D6
     043B A0 B8 A0
0762 043E                  ASCI 0
0763                *
0764 043E F8 05 B4        LOAD 4,PRINT   PRINT SUBROUTINE
     0441 F8 17 A4
0765 0444 F8 05 B5        LOAD 5,PSUB    OUTPUT SUBROUTINE
```

```
       0447  F8 96 A5
0766   044A  0F           PRL1   LDN   F          LOOK FOR START
0767   044B  FF 3E               SMI   '>'
0768   044D  32 5C               BZ    FF
0769   044F  8F                  GLO   F
0770   0450  FF 10               SMI   SOT.L
0771   0452  3A 59               BNZ   PRP1
0772   0454  9F                  GHI   F
0773   0455  FF C0               SMI   SOT.P
0774   0457  32 B2               BZ    PRXM       BACK TO START OF MEMORY
0775   0459  2F           PRP1   DEC   F
0776   045A  30 4A               BR    PRL1
0777                      *
0778   045C  F8 00        FF     LDI   0
0779   045E  BB                  PHI   B          RESET MARGIN
0780   045F  F8 18               LDI   :18        FORM FEED (RESTORE)
0781   0461  D4                  SEP   4
0782   0462  86           PLL    GLO   6          KLL LAST CHAR
0783   0463  FB FF               XRI   :FF
0784   0465  32 B3               BZ    PLLT       HALT CODE ?
0785   0467  F8 00        PNL1   LDI   0
0786   0469  AA                  PLO   A          RESET CHAR COUNT
0787   046A  9B                  GHI   B          GET MARGIN
0788   046B  A3           TAP1   PLO   3          PRESET TAP COUNT
0789   046C  5D                  STR   D
0790   046D  8A           PNL2   GLO   A          CHAR COUNT
0791   046E  ED                  SEX   D
0792   046F  F7                  SM               ARE WE THERE YET ?
0793   0470  33 78               BPZ   PNEX
0794   0472  F8 20               LDI   :20        PRINT SPACE
0795   0474  D4                  SEP   4
0796   0475  1A                  INC   A          INC CHAR COUNT
0797   0476  30 6D               BR    PNL2       ALL AGAIN
0798   0478  D2           PNEX   SEP   2          KEEP RED GOING
0799   0479  1F                  INC   F
0800   047A  9F                  GHI   F
0801   047B  FF E0               SMI   :E0
0802   047D  32 A9               BZ    PREOM      END OF RLM
0803   047F  0F                  LDN   F
0804   0480  32 A9               BZ    PREOM      NULL, END OF DATA
0805   0482  FB 5B               XRI   '['
0806   0484  32 C6               BZ    CRLF
0807   0486  0F                  LDN   F
0808   0487  FB 3E               XRI   '>'
0809   0489  32 78               BZ    PNEX       SKIP START CODES
0810   048B  0F                  LDN   F
0811   048C  FB 3C               XRI   '<'
0812   048E  32 AA               BZ    PRY
0813   0490  0F                  LDN   F
0814   0491  FB 5F               XRI   '_'
0815   0493  32 D4               BZ    TAP
0816   0495  0F                  LDN   F
0817   0496  FB 0A               XRI   :A
0818   0498  32 D9               BZ    MSEL       MARGIN SELECT
0819   049A  0F                  LDN   F
0820   049B  FB 09               XRI   9          MARGIN RESET
0821   049D  32 DE               BZ    MRST
0822   049F  0F                  LDN   F
0823   04A0  FB 20               XRI   ' '
0824   04A2  32 7A               BZ    SPA
0825   04A4  0F           PR1    LDN   F          GET CHARACTER
0826   04A5  D4                  SEP   4          PRINT IT
0827   04A6  1A                  INC   A          CHAR COUNT
0828   04A7  30 78               BR    PNEX
0829                      *
0830   04A9  2F           PREOM  DEC   F
0831   04AA  3B B5        PRX    BNF   VDU        PRINTER OR VDU ?
0832   04AC  F8 0D               LDI   :D         CR
0833   04AE  D4                  SEP   4
0834   04AF  F8 0A               LDI   :A         LF
0835   04B1  D4                  SEP   4
0836   04B2  C0 00 62     PRXM   LBR   MAIN
0837                      *
```

```
0838 04B5  F8 00     VDUX   LDI   0          PUT ZERO IN 7F
0839 04B7  B7               PHI   7
0840 04B8  30 B2             BR    PRYN
0841
0842 04BA  8A        SPA    GLO   A          CHAR COUNT
0843 04BB  FF 37            SMI   55          FULL YET ?
0844 04BD  3B A4            BF    PNL
0845 04BF  1F        SP1    INC   F          YES - TEST FOR MULTIPLE SPACES
0846 04C0  0F               LDN   F
0847 04C1  FF 20            SMI   '
0848 04C3  32 BF            BZ    SP1
0849 04C5  2F               DEC   F
0850 04C6  F8 0D     CRLF   LDI   :D         CR
0851 04C8  D4               SEP   4
0852 04C9  F8 0A            LDI   :A         LF
0853 04CB  D4               SEP   4
0854 04CC  9A               GHI   A          DOUBLE ?
0855 04CD  32 62            BZ    PNL
0856 04CF  F8 0A            LDI   :A         LF
0857 04D1  D4               SEP   4
0858 04D2  30 62            BR    PNL
0859                 *
0860 04D4  83        TAB    GLO   3          TAB POSITION
0861 04D5  FC 05            ADI   5
0862 04D7  30 6B            BR    TAB1
0863                 *
0864 04D9  9B        MSEL   GHI   B          MARGIN
0865 04DA  FC 05            ADI   5
0866 04DC  30 E0            BR    MS1
0867 04DE  F8 00     MRST   LDI   0
0868 04E0  BB        MS1    PHI   B          RESET MARGIN
0869 04E1  30 78            BR    PREX
0870                 *
0871 04E3  D2        PRLT   SEP   2          WAIT FOR KEY
0872 04E4  FB 86            XRI   :86        PRINT
0873 04E6  3A E3            BNZ   PRLT
0874 04E8  30 67            BR    PNL1
0875                 ****************************************
0876                 * VDU INTERFACE SUBROUTINE
0877                 *
0878 04EA  D4        VBYX   SEP   4
0879 04EB  E5        VBYTE  SEX   5
0880 04EC  7A               REQ
0881 04ED  64               OUT   4
0882 04EE  00               DATA  0
0883 04EF  66               OUT   6
0884 04F0  00               DATA  0
0885 04F1  F8 09            LDI   9
0886 04F3  AF               PLO   F          BIT COUNT
0887 04F4  2F        VB1    DEC   F
0888 04F5  8F               GLO   F
0889 04F6  C2 05 08         LBZ   VB3        DONE ?
0890 04F9  8E               GLO   L          GET CHAR
0891 04FA  F6               SHR              SHIFT
0892 04FB  AE               PLO   L          AND SAVE
0893 04FC  3B FF            LNF   VB2
0894 04FE  7B               SEQ
0895 04FF  65        VB2    OUT   5          SET BIT CLOCK
0896 0500  00               DATA  0
0897 0501  C4               NOP
0898 0502  64               OUT   4          RESET BIT CLOCK
0899 0503  00               DATA  0
0900 0504  7A               REQ
0901 0505  C0 04 F4         LBR   VB1
0902 0508  67        VB3    OUT   7          BYTE STROBE
0903 0509  00               DATA  0
0904 050A  C4               NOP
0905 050B  66               OUT   6
0906 050C  00               DATA  0
0907 050D  F8 01            LDI   1          ??? SHORT DELAY FOR CHARS
0908 050F  FF 01     VB4    SMI   1
0909 0511  3A 0F            BNZ   VB4
0910 0513  C0 04 EA         LBR   VBYX
```

```
0911                          ************************************************
0912                          *
0913                          * PRINT BYTE SUBROUTINE
0914                          *
0915 0516  D0          PRINX  SEP   0
0916 0517  AE          PRINT  PLO   E             SAVE CHAR
0917 0518  FB 18              XRI   :18           RESTORE CODE?
0918 051A  32 5E              BZ    PFF
0919 051C  8E                 GLO   E
0920 051D  FB 0D              XRI   :D
0921 051F  32 4A              BZ    PCR
0922 0521  8E                 GLO   E
0923 0522  FF 0A              XRI   :A
0924 0524  32 42              BZ    PLF
0925 0526  8E                 GLO   E
0926 0527  FF 20              XRI   :20
0927 0529  32 34              BZ    PSPA
0928 052B  8E                 GLO   E
0929 052C  FF 0C              XRI   :0C           ANI FLASHING '+' ?
0930 052E  32 3D              BZ    AND           YES
0931 0530  F8 20       PCFF   LDI   :20           CHAR STROBE
0932 0532  BE                 PHI   E
0933 0533  D5                 SEP   5
0934 0534  F8 40 BE    PSPA   LOAD  E,:4006       SPACE VALUE
     0537  F8 06 AE
0935 053A  D5          PLF1   SEP   5
0936 053B  30 16              BR    PRINX
0937                          *
0938 053D  F8 2B       AND    LDI   :2B           LOAD NORMAL '+' CODE
0939 053F  AE                 PLO   E
0940 0540  30 30              BR    PCFF
0941                          *
0942 0542  F8 80 BE    PLF    LOAD  E,:8008
     0545  F8 08 AE
0943 0548  30 3A              BR    PLF1
0944                          *
0945 054A  F8 44 BE    PCR    LOAD  E,:4400       CARR LEFT
     054D  F8 00 AE
0946 0550  8A          PCRL   GLO   A             CHAR COUNT
0947 0551  32 3A              BZ    PLF1
0948 0553  8E                 GLO   E             BUILD
0949 0554  FC 06              ADI   6
0950 0556  AE                 PLO   E
0951 0557  9E                 GHI   E
0952 0558  7C 00              ADCI  0
0953 055A  BE                 PHI   E
0954 055B  2A                 DEC   A
0955 055C  30 50              BR    PCRL
0956                          *
0957 055E  F8 10 BE    PFF    LOAD  E,:1000       RESTORE
     0561  F8 00 AE
0958 0564  D5                 SEP   5
0959 0565  F8 40 BE           LOAD  E,:4030       8 SPACE MARGIN
     0568  F8 30 AE
0960 056B  30 3A              BR    PLF1
0961                          *
0962                          *
0963                          ************************************************
0964                          * GETCH/DISPLAY SUBROUTINE WITH ANI INDICATOR
0965                          *
0966 056D  D1          GDS    SEP   1             DISPLAY
0967 056E  7A                 REQ                 TEST VOLTAGE LEVEL
0968 056F  E0                 SEX   0
0969 0570  62                 OUT   2             SELECT INTERNAL EF4
0970 0571  00                 DATA  0
0971 0572  37 6E              B4    GDS1          BATTERY OK
0972                          *
0973 0574  7B                 SEQ                 SECOND LEVEL TEST
0974 0575  F8 00 A4           LOAD  4,MSG
     0578  F8 B4 A4
0975 057B  37 6E              B4    GDS1          STILL FIRST LEVEL
0976                          *
0977 057D  D4                 SEP   4             MESSAGE
```

```
0978 057E              ASCI  1
0979 057B  A0 A0 A0    DATA  '        !
     0581  A0 A0 A1
     0584  A0 A0 A0
     0587  A0 A0 A0
0980 058A              ASCI  0
0981 058A  00          IDL              LOCKOUT
0982          *
0983 058B  D2    GDS1  SEP   2          GET CHAR
0984 058C  32 6D       BZ    GDS        LOOP
0985          *
0986 058E  85          GLO   5          GET RETURN FLAG
0987 058F  C2 00 6B    LBZ   MAIN2
0988 0592  C0 02 27    LBR   INSL3
0989
0990          *****************************************
0991          * PRINTER INTERFACE SUBROUTINE
0992          *
0993 0595  D4    PSUBX SEP   4
0994 0596  E5    PSUB  SEX   5
0995 0597  65          OUT   5
0996 0598  00          DATA  0
0997 0599  64          OUT   4
0998 059A  00          DATA  0
0999 059B  35 9B PSL1  B2    PSL1       PRINTER READY ?
1000 059D  F8 00       LDI   0
1001 059F  A6          PLO   6          BIT COUNT
1002 05A0  8E          GLO   E
1003 05A1  7B    PSL5  SEQ
1004 05A2  F6          SHR
1005 05A3  33 A6       BDF   PSL2       BIT = 1 ?
1006 05A5  7A          REQ
1007 05A6  B6    PSL2  PHI   6          SAVE SHIFTED BITS
1008 05A7  16          INC   6
1009 05A8  86          GLO   6
1010 05A9  FD 08       SDI   :08
1011 05AB  32 BA       BZ    PSL3       8 BITS DONE ?
1012 05AD  86          GLO   6
1013 05AE  FD 10       SDI   :10
1014 05B0  3A BC       BNZ   PSL4       16 BITS ?
1015 05B2  7A          REQ
1016 05B3  66          OUT   6          SEND STROBE
1017 05B4  00          DATA  0
1018 05B5  67          OUT   7
1019 05B6  00          DATA  0
1020 05B7  C0 05 95    LBR   PSUBX
1021 05BA  9E    PSL3  GHI   E
1022 05BB  B6          PHI   6
1023 05BC  96    PSL4  GHI   6
1024 05BD  7A          REQ
1025 05BE  30 A1       BR    PSL5
1026          *
1027          *
1028          *****************************************
1029          * VDU CHARACTER ROUTINE
1030          *
1031 05C0  D0    VCHX  SEP   0
1032 05C1  AE    VCHAR PLO   E
1033 05C2  FB 0A       XRI   :A         LINE FEED
1034 05C4  C2 06 22    LBZ   VLF
1035 05C7  8E          GLO   E
1036 05C8  FB 18       XRI   :18        FORM FEED
1037 05CA  C2 06 14    LBZ   VFF
1038 05CD  8E          GLO   E
1039 05CE  FB 0D       XRI   :D         CR?
1040 05D0  3A D7       BNZ   UCT        NO
1041 05D2  F8 0C       LDI   :0C        CR AND CLEAR LINE ON SCREEN
1042 05D4  C0 05 FD    LBR   VCR
1043 05D7  8E    UCT   GLO   E
1044 05D8  FB 08       XRI   :08        CASSETTE ERROR CHAR?
1045 05DA  3A DF       BNZ   UCT1       NO
1046          *
1047 05DC  F8 A7       LDI   :A7        YES, SET UC FOR VDU
1048 05DE  AE          PLO   E
```

```
1049
1050 05DF  8L           LCT1   GLO   E
1051 05E0  FF 41               SMI   :41
1052 05E2  3B EC               BNF   VCF1
1053 05E4  FF 1A               SMI   :1A
1054 05E6  33 EC               BDF   VCH1
1055 05E8  8E                  GLO   E
1056 05E9  F9 80               ORI   :80         SET INVERSE FOR UC
1057 05EB  AE                  PLO   E
1058 05EC  D5           VCH1   SEP   5
1059 05ED  8A                  GLO   A           CHAR COUNT
1060 05EE  FF 3F               SMI   63          WAS THAT THE 64th CHAR?
1061 05F0  CA 05 C0            LBNZ  VCHX        NO, CONTINUE
1062                    *
1063 05F3  1F                  INC   F           YES, LOOK FOR SPACE AT CHAR.65
1064 05F4  0F                  LDN   F
1065 05F5  2F                  DEC   F           CORRECT MEMA
1066 05F6  FB 20               XRI   :20         SPACE?
1067 05F8  C2 06 09            LBZ   VC65        YES
1068                    *
1069 05FB  F8 19               LDI   :19         NO, SET FLASH FOR OVERRUN
1070 05FD  AE           VCR    PLO   E
1071 05FE  D5                  SEP   5           DISPLAY BYTE
1072 05FF  F8 03        VCD1   LDI   3           ??? LONG DELAY FOR CONTROL CODES
1073 0601  BE                  PHI   E
1074 0602  2E           VCD2   DEC   E
1075 0603  9E                  GHI   E
1076 0604  3A 02               BNZ   VCD2
1077 0606  C0 05 C0            LBR   VCHX
1078                    *
1079 0609  AA           VC65   PLO   A           ZERO CHAR. COUNT
1080 060A  1F           VCSP   INC   F           MOVE OVER SPACE
1081 060B  0F                  LDN   F           AND LOOK AHEAD
1082 060C  FF 20               SMI   :20         FOR MULTIPLE SPACES
1083 060E  32 0A               BZ    VCSP
1084                    *
1085 0610  2F                  DEC   F           CORRECT MEMA
1086 0611  C0 05 FF            LBR   VCD1        AND DELAY FOR AUTO CRLF
1087                    *
1088 0614  F8 0C        VFF    LDI   :C          FORM FEED
1089 0616  AE                  PLO   E
1090 0617  D5                  SEP   5
1091 0618  F8 1B               LDI   :1B         DELAY
1092 061A  BE                  PHI   E
1093 061B  2E           VFF1   DEC   E
1094 061C  9E                  GHI   E
1095 061D  3A 1B               BNZ   VFF1
1096 061F  C0 05 C0            LBR   VCHX
1097                    *
1098 0622  27           VLF    DEC   7           LINE COUNT
1099 0623  87                  GLO   7
1100 0624  32 2C               BZ    VEND        8 LINES DONE?
1101 0626  F8 0A               LDI   :0A         NO, LF
1102 0628  L5                  SEP   5
1103 0629  C0 05 FF            LBR   VCD1        GO TO CONTROL DELAY
1104                    *
1105 062C  9F           VEND   GHI   F           COPY F TO 7
1106 062D  B7                  PHI   7
1107 062E  8F                  GLO   F
1108 062F  A7                  PLO   7
1109 0630  17                  INC   7           AND INCREMENT
1110 0631  F8 00 B0     VEND1  LOAD  0,MAIN      RETURN TO MAIN
     0634  F8 62 A0
1111 0637  D0                  SEP   0
1112
1113                    ************************************************
1114                    *
1115                    * CASSETTE ROUTINES
1116                    *
1117                    ************************************************
1118                    *
1119                    * CASSETTE SEND ROUTINE
1120                    *
```

```
1121                        * FOR DIGITAL INTERFACE
1122                        *
1123                        *
1124                        * SEND BIT ROUTINE
1125                        *
1126 0636  3D 36   STOP   BN2   STOP      WAIT FOR CLOCK
1127 063A  7B             SEQ             START CHARGING
1128 063B  C4             NOP
1129 063C  C4             NOP
1130 063D  3D 3D   STP1   BN2   STP1      WAIT FOR END OF CLOCK
1131 063F  C4             NOP
1132 0640  C4             NOP
1133 0641  3D 41   STP2   BN2   STP2      WAIT FOR CLOCK
1134 0643  C4             NOP
1135 0644  C4             NOP
1136 0645  3D 45   STP3   BN2   STP3      WAIT FOR END OF CLOCK
1137 0647  7A             REQ             START DISCHARGE
1138 0648  C4             NOP
1139 0649  C4             NOP
1140 064A  3D 4A   STP4   BN2   STP4      WAIT FOR CLOCK
1141 064C  C4             NOP
1142 064D  C4             NOP
1143 064E  3D 4E   STP5   BN2   STP5      WAIT FOR END OF CLOCK
1144 0650  30 6E          BR    STPR      GO BACK
1145                        *
1146 0652  3D 52   ZERO   BN2   ZERO      WAIT FOR CLOCK
1147 0654  7B             SEQ             START CHARGING
1148 0655  C4             NOP
1149 0656  C4             NOP
1150 0657  3D 57   ZRO1   BN2   ZRO1      WAIT FOR END OF CLOCK
1151 0659  C4             NOP
1152 065A  C4             NOP
1153 065B  3D 5B   ZRO2   BN2   ZRO2      WAIT FOR CLOCK
1154 065D  7A             REQ             START DISCHARGE
1155 065E  C4             NOP
1156 065F  C4             NOP
1157 0660  3D 60   ZRO3   BN2   ZRO3      WAIT FOR END OF CLOCK
1158 0662  30 81          BR    OZR       GO BACK
1159                        *
1160 0664  3D 64   ONES   BN2   ONES      WAIT FOR CLOCK
1161 0666  7B             SEQ             START CHARGING
1162 0667  C4             NOP
1163 0668  C4             NOP
1164 0669  3D 69   ONE1   BN2   ONE1      WAIT FOR END OF CLOCK
1165 066B  7A             REQ             START DISCHARGE
1166 066C  30 81          BR    OZR       GO BACK
1167                        *
1168                        * SEND WORD ROUTINE
1169                        *
1170 066E  D0      STPR   SEP   0         RETURN TO CALLER
1171 066F  E0      SEWO   SEX   0
1172 0670  72             LDXA            BIT COUNT
1173 0671  B3             PHI   3
1174 0672  72             LDXA
1175 0673  E4             SEX   4
1176 0674  A3             PLO   3
1177 0675  FF 80          LDI   :80
1178 0677  FE             SHL             MAKE DF=1
1179 0678  0F             LDN   F         LOAD DATA
1180 0679  AA             PLO   A         SAVE IT
1181 067A  8A      SEW1   GLO   A         GET DATA
1182 067B  7E             RSHL            TEST BIT
1183 067C  AA             PLO   A         SAVE RESULT
1184 067D  33 64          BDF   ONES      MAKE A ONE
1185 067F  30 52          BR    ZERO      MAKE A ZERO
1186                        *
1187 0681  23      OZR    DEC   3         BIT COUNT-1
1188 0682  93             GHI   3         CHECK BIT COUNT
1189 0683  3A 7A          BNZ   SEW1      IF NOT ZERO
1190 0685  83             GLO   3         GO BACK AND
1191 0686  3A 7A          BNZ   SEW1      SEND ANOTHER BIT
1192                        *
1193 0688  30 36          BR    STOP      MAKE A STOP BIT
```

```
1194                    *
1195                    *
1196                    *
1197 068A  30 8F         CASSW B3   IICSC
1198 068C  C0 00 62              LBR  MAIN
1199 068F  F8 00 B4      IICSC LOAD 4,MSG
     0692  F8 D4 A4
1200 0695  F8 40 BE            LOAD D,:400D
     0698  F8 0F AE
1201 069B  D4                  SEP  4
1202 069C                      ASCI 1
1203 069C  D4 C1 D0            DATA 'TAPE   WRITE '
     069F  C5 A0 D7
     06A2  D2 C9 D4
     06A5  C5 A0 A0
1204 06A8  E0                  SEX  0
1205 06A9  65                  OUT  5          SETS IO LINE '4' HIGH
1206 06AA  00                  DATA 0          FOR 1X MODE
1207 06AB  F8 06 B4            LOAD 4,SEWC
     06AE  F8 6F A4
1208 06B1  0F           SSCL   LDN  F          GET DATA
1209 06B2  FB 3E               XRI  :3E        CHECK FOR START CODE
1210 06B4  32 C3               BZ   LRI        START SENDING
1211 06B6  8F                  GLO  F          CHECK FOR START OF MEMORY
1212 06B7  FB 10               XRI  :10
1213 06B9  3A C0               BNZ  SSCJ
1214 06BB  9F                  GHI  F
1215 06BC  FB C0               XRI  :C0
1216 06BE  32 C3               BZ   LRI        START SENDING
1217 06C0  2F           SSCJ   DEC  F          F -1
1218 06C1  30 B1               BR   SSCL       LOOP AGAIN
1219 06C3  F8 FF        LRI    LDI  :FF        FOR RUN IN
1220 06C5  5F                  STR  F
1221 06C6  D4                  SEP  4
1222 06C7  0F                  DATA :0F
1223 06C8  00                  DATA :00
1224 06C9  F8 3E               LDI  :3E        RELOAD START CODE
1225 06CB  5F                  STR  F
1226 06CC  0F           MDSL   LDN  F          GET DATA
1227 06CD  C2 06 EA            LBZ  LRO        TERMINATE WRITE ON NULL
1228 06D0  D4                  SEP  4          SEND IT
1229 06D1  00                  DATA :00
1230 06D2  06                  DATA :06        (ITS 6 BITS)
1231 06D3  0F                  LDN  F          GET DATA AGAIN
1232 06D4  FB 3C               XRI  :3C        CHECK FOR END CODE
1233 06D6  3A E0               BNZ  LROA       CONTINUE
1234 06D8  2F                  DEC  F          CHECK FOR
1235 06D9  0F                  LDN  F
1236 06DA  FB 3C               XRI  :3C        DOUBLE END CODE
1237 06DC  C2 06 EA            LBZ  LRO
1238 06DF  1F                  INC  F
1239 06E0  9F           LROA   GHI  F          CHECK FOR END OF MEMORY
1240 06E1  FB E0               XRI  :E0
1241 06E3  32 E9               BZ   LROP       GO TO RUN OUT
1242 06E5  1F                  INC  F          F+ 1
1243 06E6  C0 06 CC            LBR  MDSL       GO BACK FOR MORE
1244 06E9  2F           LROP   DEC  F          GET BACK INTO VALID MEMORY
1245 06EA  F8 FF        LRO    LDI  :FF        FOR RUN OUT
1246 06EC  5F                  STR  F
1247 06ED  D4                  SEP  4          SEND IT
1248 06EE  0F                  DATA :0F
1249 06EF  00                  DATA :00
1250 06F0  F8 3C               LDI  :3C        RELOAD END CODE
1251 06F2  5F                  STR  F
1252 06F3  C0 00 62     LROX   LBR  MAIN
1253                    *
1254                    ******************************************
1255                    *
1256                    * CASSETTE READ ROUTINE
1257                    *
1258                    ******************************************
1259                    *
1260 06F6  F8 00        CASSI  LDI  0
1261 06F8  5F                  STR  F
```

```
1262 06F9  F8 01              LDI   :01       INSERT FLAG
1263 06FB  C0 07 04           LBR   CASS1
1264 06FE  1F        CASSF    INC   F         MOVE MEM POINTER TO EMPTY SPACE
1265 06FF  F8 3E              LDI   :3E       PUT A START CODE THERE
1266 0701  5F                 STR   F
1267 0702  F8 00              LDI   0
1268 0704  AA        CASS1    PLO   A         NOT AN INSERT
1269 0705  30 0A     CASS2    BR    11A1
1270 0707  C0 00 62           LBR   MAIN
1271 070A  F8 C0 BE  11A1     LOAD  E,:C002   POINT TO STACK
     070D  F8 02 AE
1272 0710  8A                 GLO   A         GET FLAG
1273 0711  5E                 STR   E         PUSH TO STACK
1274 0712  F8 00 B4           LOAD  4,MSG
     0715  F8 14 A4
1275 0718  F8 40 BE           LOAD  E,:400F
     071B  F8 01 AE
1276 071E  D4                 SEP   4
1277 071F                     ASCI  1
1278 071F  D4 C1 D0           DATA  'TAPE    READ    '
     0722  C5 A0 D2
     0725  C5 C1 C4
     0728  A0 A0 A0
1279
1280                        * INIT
1281                        *
1282 072F  E0                 SEX   0
1283 0720  F8 C0 BE           LOAD  E,:C003   POINT TO STACK
     072F  F8 03 AE
1284 0732  64                 OUT   4         SETS IO LINE '4' LOW
1285 0733  00                 DATA  0                FOR RX MODE
1286 0734  EE                 SEX   E
1287 0735  F8 00 AA           LOAD  A,0
     0738  F8 00 AA
1288 073B  F8 07 B4           LOAD  4,CRTS
     073E  F8 DE A4
1289 0741  F8 01 B3           LOAD  3,:0180   IGNOR THIS MUCH RUN IN
     0744  F8 80 A3
1290
1291                        * RUN IN
1292                        *
1293 0747  3D 47     CRR1     BN2   CRR1      WAIT FOR INPUT
1294 0749  23                 DEC   3
1295 074A  93                 GHI   3
1296 074B  3A 47              BNZ   CRR1
1297 074D  83                 GLO   3
1298 074E  3A 47              BNZ   CRR1
1299                        *
1300                        * SET UP TIMING VALUES
1301                        *
1302 0750  3D 50     CRR2     BN2   CRR2      WAIT FOR FRESH INPUT
1303 0752  D4                 SEP   4         TIME INPUT
1304 0753  04                 DATA  :04       TIMING CONSTANT
1305 0754  A5                 PLO   5         SHOULD BE 1's VALUE
1306 0755  FE                 SHL                    *2
1307 0756  A6                 PLO   6         0's VALUE=2*1'sVALUE
1308 0757  F4                 ADD             +1's VALUE
1309 0758  A7                 PLO   7         STOP's VALUE=3*1's VALUE
1310 0759  F6                 SHR             /2 (3*1'sVALUE/2)
1311 075A  B5                 PHI   5         1/0's VALUE
1312 075B  F4                 ADD             1/0's+1's VALUE
1313 075C  B6                 PHI   6         0/STOP's VALUE
1314                        *
1315                        * START LOOKING FOR REAL DATA
1316                        *
1317 075D  3D 5D     CRR3     BN2   CRR3      WAIT FOR NEXT INPUT
1318 075F  D4                 SEP   4         TIME IT
1319 0760  04                 DATA  :04       TIMING CONSTANT
1320                        *
1321                        * WORK OUT WHAT DATA IS
1322                        *
1323 0761  3C D1     CRR4     IN1   TL2
1324 0763  9A                 GHI   A         CHECK BIT COUNT FOR RUN OUT
```

```
1325 0764   FB 0E              XRI    :0E
1326 0766   3A 6D              BNZ    INTE
1327 0768   8A                 GLO    A
1328 0769   FB 00              XRI    :00
1329 076B   32 D1              BZ     TL2
1330 076D   95          INTE   GHI    5             GET 1/0's VALUE
1331 076E   F7                 SM                   1/0's - NEW
1332 076F   33 8C              BDF    1AO           IF POS ITS A 1 SO JUMP
1333 0771   96                 GHI    6             GET 0/STOP's VALUE
1334 0772   F7                 SM                   0/STOP's - NEW
1335 0773   33 9A              BDF    1AZ           IF POS ITS A 0 SO JUMP
1336 0775   FC                 LDX                  GET DATA ITS A STOP BIT
1337 0776   A7                 PLO    7
1338 0777   86                 GLO    6             GET 0's VALUE
1339 0778   F4                 ADD                  STOP's+0's VALUE
1340 0779   F6                 SHR                  /2 (STOP's+0's)/2
1341 077A   B6                 PHI    6             NEW 0/STOP's VALUE
1342 077B   8A                 GLO    A             GET BIT COUNT
1343 077C   FF 09              SMI    :09           BIT COUNT - 9
1344 077E   3B D5              BNF    ICD           IF NEG ITS MANGLED SO JUMP
1345 0780   32 A3              BZ     IPD           IF ZERO ITS SOME DATA SO JUMP
1346 0782   F8 00 BA           LOAD   A,0           RESET BIT COUNT
     0785   F8 00 AA
1347 0788   D4                 SEP    4             TIME NEW INPUT
1348 0789   0C                 DATA   12            TIMING CONSTANT
1349 078A   30 61              BR     CHK4
1350
1351                        *  DATA BIT IS A 1
1352                        *
1353 078C   86          1AO    GLO    6             GET 0's VALUE
1354 078D   F4                 ADD                  0's+1's VALUE
1355 078E   F6                 SHR                  /2 (0's+1's)/2
1356 078F   B5                 PHI    5             NEW 1/0'sVALUE
1357 0790   F8 01              LDI    :01           LOAD A 1
1358 0792   F6                 SHR                  MAKE DF=1
1359
1360                        *  MAKE UP DATA BYTE
1361                        *
1362 0793   97          CHK5   GHI    7             GET TEMP DATA
1363 0794   7E                 SHLC                 SHIFT NEW BIT IN
1364 0795   B7                 PHI    7             PUT TEMP DATA BACK
1365 0796   D4                 SEP    4             TIME NEXT INPUT
1366 0797   10                 DATA   :10           TIMING CONSTANT
1367 0798   30 61              BR     CHK4
1368
1369                        *  DATA BIT IS A 0
1370                        *
1371 079A   87          1AZ    GLO    7             GET STOP's VALUE
1372 079B   F4                 ADD                  0's+STOP's VALUE
1373 079C   F6                 SHR                  /2 (0's+STOP's)/2
1374 079D   B6                 PHI    6             NEW 0/STOP's VALUE
1375 079E   F8 00              LDI    0             LOAD A 0
1376 07A0   F6                 SHR                  MAKE DF=0
1377 07A1   30 93              BR     CHK5
1378                        *
1379                        *  PUSH DATA AWAY
1380                        *
1381 07A3   9F          IPD    GHI    F             TEST FOR END OF MEMORY
1382 07A4   FB E0              XRI    :E0
1383 07A6   C2 00 76           LBZ    MFULL
1384 07A9   2E                 DEC    E
1385 07AA   72                 LDXA
1386 07AB   32 B1              BZ     CHK6          LOOK AT INSERT FLAG
1387 07AD   0F                 LDN    F             JUMP IF NOT SET
1388 07AE   CA 00 76           LBNZ   MFULL         CHECK DATA IN MEMORY
1389 07B1   F8 00 BA    CHK6   LOAD   A,0           RESET BIT COUNT
     07B4   F8 00 AA
1390 07B7   97                 GHI    7             GET DATA BYTE
1391 07B8   5F                 STR    F
1392 07B9   1F                 INC    F
1393 07BA   D4                 SEP    4             TIME NEXT INPUT
1394 07BB   10                 DATA   :10           TIMING CONSTANT
1395 07BC   30 61              BR     CHK4
```

```
1396                  *
1397                  ************************************
1398                  * EF2 TIMER SUBROUTINE
1399                  *
1400 07BE  D0         GOS    SEP   0           RETURN
1401 07BF  E0                CHTS  SEX   0
1402 07C0  72                      LDXA              GET TIMING CONSTANT
1403 07C1  A3                      PLO   3
1404 07C2  F8 00             LDI   0
1405 07C4  FE                      SHL                MAKE SURE DF=0
1406 07C5  B3                      PHI   3            LOW READY COUNT
1407 07C6  13         TL1    INC   3            INC TIMING COUNT
1408 07C7  33 D1             BDF   TL2          CHECK FOR OVERRUN
1409 07C9  3B C6             BN2   TL1          STILL TIMING?
1410 07CB  1A                INC   A            IF NOT INC BIT COUNT
1411 07CC  83                GLO   3
1412 07CD  EE                SEX   E
1413 07CE  5E                STR   E            SAVE COUNT
1414 07CF  30 BE             BR    GOS
1415 07D1  2F         TL2    DEC   F
1416 07D2  C0 02 50          LBR   PACK
1417                  *
1418                  * DATA IS MANGLED
1419                  *
1420 07D5  2F         ICD    DEC   F            LOOK AT PREV. BYTE
1421 07D6  0F                LDN   F
1422 07D7  FB 08             XRI   :08          IS IT CORRUPTED DATA
1423 07D9  32 E1             BZ    ICD1
1424 07DB  F8 08             LDI   :08
1425 07DD  B7                PHI   7
1426 07DE  1F                INC   F            REPLACE DATA POINTER
1427 07DF  30 A3             BR    IPD
1428 07E1  F8 08      ICD1   LDI   :08
1429 07E3  B7                PHI   7
1430 07E4  30 A3             BR    IPD
1431                  *
1432                         END
```

```
0000 ERRORS

AND    053D   LACKC  015E   LACKS  0110   CASS1  0704   CASSI  00F6
CASSK  00FD   CASSN  006A   CASSX  0705   CHL1   016D   CHLN   016E
CONT   0105   CRLF   04C6   CHK1   0747   CHK2   0750   CHK3   075D
CHK4   0761   CHK5   0793   CHK6   07E1   CHTS   07BF   LDEL   03DA
DECPT  0179   DEL    01DD   DEL1   01DA   DELC   01C5   DELC1  01CE
DELC2  01D1   DELEX  01DD   DELS   01DA   DISP   0362   DISPL  0361
DL1    03AD   DL10   03B9   DL16   03CC   DL2    038B   DL3    0374
DL4    037A   DL5    039C   DL6    03BB   DL7    03B8   DL9    03BB
DP1    0183   DP2    018A   DP3    018D   DPEX   0178   ENTRY  0000
FF     045C   FLASH  03B8   FORWC  0155   FORWS  00FE   GA20   02A7
GA40   02AC   GCC    02B1   GCC1   02C4   GCC2   02C9   GCH0   027A
GCHB   0272   GCHX   026B   GCF    02D7   GCS    02D2   GCX1   029E
GCX2   02A0   GCY    02CD   GDS    056D   GDS1   058B   GETCH  026C
GOS    07BE   GTRAN  0291   IA0    078C   IAZ    079A   ICD    07D5
ICD1   07E1   IICSC  068F   INCPT  00C5   INSC   022F   INSL1  0223
INSL3  0227   INSL4  023D   INSL5  0220   INSLF  0215   INSRT  01F2
INTE   076D   IP1    00D1   IP2    00D7   IP3    00CF   IP4    00CC
IPD    07A3   IPEX   00C4   JMP    0130   JMPL   012E   JMPS   012A
JMPT   00A4   JTABL  00DE   LFI    0FC3   LFO    06EA   LROA   06E0
LROF   06E9   LPCY   06F3   LUT    02F1   MAIN   0062   MAIN2  0068
MCONT  0097   MDSL   06CC   MF1    0090   MFULL  0076   MFST   04DE
MS1    04E0   MSEL   04D9   MSG    00F4   MSGLP  00E7   MSGX   00F3
MSTOR  0072   OHE1   0669   OKES   0664   OZE    0681   PACK   0250
PACKJ  01DA   PCH    0530   PCF    054A   PCRL   0550   PD1    0262
PLLP   0258   PFF    055E   PLT    04E3   PLF    0542   PLF1   053A
PN1    04A4   PNEX   0478   PNL    0462   PNL1   0467   PNL2   046D
PRE1   0459   PREOM  04A9   PRINC  0425   PRIN1  0419   PRIN2  041D
PRIN3  041F   PRINT  0517   PRINX  0516   PRL1   044A   PRX    04AA
PRXN   04B2   PSL1   059D   PSL2   05A6   PSL3   05DA   PSL4   05FC
PSL5   05A1   PSPA   0534   PSUB   0596   PSUBX  0595   PU1    0207
PU2    0211   PULP   01FF   SEV1   067A   SEVC   066F   SOT    C010
SP1    04FF   SPA    04FA   SSCJ   06C0   SSCL   06F1   START  0050
STOP   063E   STP1   063D   STP2   0641   STP3   0645   STP4   064A
```

| | | | | | | | | | |
|---|---|---|---|---|---|---|---|---|---|
| STP5 | 064E | STPP | 066E | TAP | 04D4 | TAP1 | 046F | TEMP | C000 |
| TIAI | 070A | TL1 | 07C6 | TL2 | 07D1 | UCT | 05D7 | UCT1 | 05DF |
| V1 | 04C9 | VF1 | 04F4 | VF2 | 04FF | VD3 | 05CF | VF4 | 050F |
| VBYTE | 04EF | VLY3 | 04EA | VC65 | 0609 | VCD1 | 05FF | VCD2 | 0602 |
| VCH1 | 05EC | VCFAR | 05C1 | VCFX | 05C0 | VCR | 05FD | VCSF | 060A |
| VLU | 03F0 | VFCX | 04F5 | VEND | 062C | VEND1 | 0631 | VFF | 0614 |
| VFF1 | 061F | VLF | 0622 | VSTRT | 005C | VTST | 0107 | WLLP | 019L |
| WENL | 011E | WFS | 0051 | WIFL | 016F | WIPE1 | 01A4 | WLP | 01A6 |
| ZEL0 | 0652 | ZI1 | 0121 | ZIFL | 011F | ZIPS | 011E | ZJ1 | 0143 |
| ZJ3 | 0152 | ZFJ2 | 013B | ZPJM | 0137 | ZRC1 | 0657 | ZRC2 | 065B |
| ZRC3 | 0660 | * | | | | | | | |

It is believed that the operator code illustrated by FIG. 4 is easily memorized because, although the individual graphic correlation between a selected key or keys-combination for a given alphabet letter might be changed, there is an overall graphic correlation that enables a majority of the alphabet letters to be so represented and this provides a learning framework.

It has been found that use of such an operator code is an effective aid in the use of the word-processor because it is easily and speedily memorable.

The use of what is basically a five key keyboard, the additional thumb key providing a second five key keyboard, with the word-processor of this invention has the advantages of providing a simpler, smaller and cheaper construction than that of a conventional keyboard because the need for a separate key for each character or control instruction is obviated and the speed of use of this chord keyboard is comparable with a conventional keyboard as the fingers do not need to be moved from one key to another and the thumb has only to move between two keys and does not have to so move when alphabet letters are being inputted to the word-processor.

Although a right-hand keyboard device has been described and illustrated, it is apparent that a "mirror-image" left-handed device could equally well be produced.

A liquid crystal or other low power consumption alpha-numeric display could be used instead of the LED display 13. An important feature of a preferred embodiment of the invention is that the keys are not designated or identified. Thus, a new operator is forced to touch-type. A sighted operator additionally uses the visual feed-back from the display device in an eye-brain visual interaction in learning to use the word-processor. It has, however, been discovered that practised operators or non-sighted operators effectively operate the word-processor without reference to the display device by using tactile hand-brain interaction. This is an inherent human capability, for example a proficient pianist does not need to look at the keyboard when playing a chord on a piano. Similarly, a proficient operator does not need to look at the word-processor to operate it and thus the word-processor can be used in areas and situations not previously available to conventional word-processors such as when travelling, for taking notes at lectures, during business conferences etc.

I claim:

1. A single hand portable word-processor comprising:
    (i) a microprocessor; to enable said word-processor to be connected to a printer;
    (v) memory means connected to said microprocessor;
    (vi) an internal power supply connected to supply power to all the aforesaid components; the microprocessor being programmed to respond to signals produced by operation of a combination of up to a maximum of five keys to generate a coded signal representing a particular alpha-numeric character or processing instruction and to process the character signals in response to the instruction signals, to feed signals to the display device for display of processed characters as an edited text, and to the memory means to store the edited text and print format instruction signals available for transmission through the output means;
    (vii) each one of said four finger keys being positioned so as to be preferentially operated by a respective one of the fingers of an operator's hand and the thumb keys being conveniently positioned to be operated by the operator's thumb, and
    (viii) a main body generally in the form of a truncated rectangular pyramid having a front face carrying said four finger keys and a side face carrying said two thumb keys.

2. A word-processor as defined in claim 1, wherein each of said keys is a micro-switch and said four finger keys are each set in ellipsoidally concave insets in said front face.

3. A hand portable word-processor, comprising a manually operable input chord keyboard having four non-thumb finger keys and at least one thumb key, said keys being arranged to be operated with only one hand, and said keys being selectively operable individually and also in different combinations to provide a different pre-selected combination of operated and non-operated ones of said thumb and non-thumb keys for each character in an alphabetic system having a total number of characters greatly exceeding the number of said thumb and non-thumb keys, a microprocessor electrically connected to said keyboard and responsive to the chord operation of said keys for producing a different coded electrical signal for each of the different pre-selected combinations of operated and non-operated ones of said keys, whereby each of the different electrical signals represents a different character in said system, memory means electrically connected to said microprocessor, a character display device electrically connected to said microprocessor for displaying the characters represented by said signals, connector means electrically connected to said microprocessor and adapted to be connected to an external printer or other read-out device, means for supplying programmed instructions, including print format instructions, to said microprocessor, power supply means electrically connected to power said microprocessor, said memory means, said display device and said keyboard, and a single casing housing said keyboard, said microprocessor, said display device, said memory means, said power supply means, said connector means and said programmed instruction supplying means, said casing being sized and configured (a) to enable the operator to hold the casing in one hand while operating said keys with only his other hand or (b) to be supported on a surface while the operator operates said keys with only one hand, said microprocessor being responsive to said instructions for performing different functions including storing said electrical signals in said memory means as a text and operating said printer to print said text when the printer is connected to said connector means.

4. The hand portable word-processor defined in claim 3 wherein said keyboard includes a further thumb key arranged to be operated with the same thumb used for operating said one thumb key, said further thumb key being selectively operable together with one or more of said non-thumb keys for supplying instruction signals to said microprocessor.

5. The hand portable word-processor defined in claim 3 wherein said keyboard includes a further thumb key arranged to be operated with the same thumb used for operating said one thumb key, said further thumb key being selectively operable with preselected ones of said non-thumb keys for supplying instruction signals to said microprocessor for selectively editing said text.

6. The hand portable word-processor defined in claim 3 wherein said keyboard includes a further thumb key arranged to be operated with the same thumb used for operating said one thumb key, said further thumb key being selectively operable with preselected ones of said non-thumb keys for supplying instruction signals to said microprocessor for selectively controlling the display of said text on said display device.

7. The hand portable word-processor defined in claim 3 wherein said keyboard includes a further thumb key arranged to be operated with the same thumb used for operating said one thumb key, said further thumb key being selectively operable with preselected ones of said non-thumb keys for supplying instruction signals to said microprocessor for (a) selectively editing the stored text by selectively deleting selected characters in said text and inserting selected characters into said text, and (b) selectively controlling the read-out of the text on said display device.

8. The hand portable word-processor dkeys, said control key being selectively operable together with pre-selected ones of the other of said keys for supplying instruction signals to said microprocessor for selectively editing the stored text and for selectively controlling the read-out of the text on said display device.

9. The hand portable word-processor defined in any one of the preceding claims 7–11 wherein said four non-thumb finger keys are the only non-thumb finger keys in said keyboard.

10. The hand portable word-processor defined in claim 3 wherein said casing has front and rear oppositely facing ends and a top wall extending between said ends and formed with an exterior intermediate surface which is spaced from said ends and which is sloped rearwardly toward said rear end to face generally forwardly in the direction of the front end, said non-thumb keys lying along said intermediate surface and being arranged along an arcuate line at positions where the tips of operator's non-thumb fingers overlie said non-thumb keys when the palm of the operator's hand is positioned over said top wall at a location which lies rearwardly of said intermediate surface.

11. The hand portable word-processor defined in claim 10 wherein said casing is formed with an exterior sloped side surface extending between said intermediate surface and said rear end and contained in an envelope which transversely intersects said intermediate surface, said thumb key being positioned at said side surface.

12. The hand portable word-processor defined in claim 11 wherein said intermediate and side surfaces are contained in an envelope having the configuration of a pyramid.

13. The hand portable word-processor defined in any one of the preceding claims 10–12 wherein said display device is positioned at a further surface of said top wall between said front end and said intermediate surface, and said further surface being sloped to face generally in the direction of said intermediate surface.

14. The hand-portable word-processor defined in claim 3, there being a unique pre-selected combination of said keys assigned for operation to represent each character in a majority of the characters making up said system to thereby provide a group of unique key combinations in which each unique key combination of the group represents a different character in said majority of characters, and the arrangement of said keys being pre-selected to provide a pictographic relationship between each key combination in a majority of said unique combinations and the alphabetic character represented thereby.

* * * * *

UNITED STATES PATENT AND TRADEMARK OFFICE
CERTIFICATE OF CORRECTION

PATENT NO. : 4,360,892

DATED : November 23, 1982

INVENTOR(S) : Cyril Endfield

Page 1 of 2

It is certified that error appears in the above—identified patent and that said Letters Patent is hereby corrected as shown below:

Column 1, line 41, "next" should be --text.

Column 3, line 20, "U.K. Pat. No." should be --U.K. Pat. Specification No.--.

Column 4, line 15, after "TV or" delete "moniprogramme" and insert --monitor screen display, a dictaphone microcassette drive or a Modem/accoustic coupler. The programme--.

Column 49, Claim 1, line 63, after "(i) a microprocessor;" delete "to enable said word-processor to be connected to a printer;" and insert:

UNITED STATES PATENT AND TRADEMARK OFFICE
CERTIFICATE OF CORRECTION

PATENT NO. : 4,360,892
DATED : November 23, 1982
INVENTOR(S) : Cyril Endfield

It is certified that error appears in the above—identified patent and that said Letters Patent is hereby corrected as shown below:

--(ii) a manually operable input chord keyboard connected to microprocessor and having four finger keys and two thumb keys;
(iii) a display device connected to said microprocessor;
(iv) output means connected to said microprocessor to enable said word-processor to be connected to a printer;--

Column 51, Claim 8, Line 42, after "word-processor" delete "dkeys," and insert:
--defined in claim 3 wherein said keyboard includes a control key arranged to be operated with the same hand used for operating said thumb and non-thumb keys,--.

Column 52, Claim 9, Line 2, "7-11" should be --3 - 7.

Signed and Sealed this

Nineteenth Day of April 1983

[SEAL]

Attest:

Attesting Officer

GERALD J. MOSSINGHOFF
Commissioner of Patents and Trademarks